United States Patent [19]

Block

[11] Patent Number: 4,554,608

[45] Date of Patent: Nov. 19, 1985

[54] CONNECTOR FOR ELECTROMAGNETIC IMPULSE SUPPRESSION

[76] Inventor: Roger R. Block, P.O. Box 1198, Gardnerville, Nev. 89410

[21] Appl. No.: 539,709

[22] Filed: Oct. 6, 1983

Related U.S. Application Data

[63] Continuation-in-part of Ser. No. 441,765, Nov. 15, 1982, Pat. No. 4,409,637.

[51] Int. Cl.[4] .......... H02H 3/22

[52] U.S. Cl. .......... 361/119; 333/23; 361/120

[58] Field of Search .......... 333/12, 23, 167, 185; 361/119, 120

[56] References Cited

U.S. PATENT DOCUMENTS

| | | | |
|---|---|---|---|
| 2,030,179 | 2/1936 | Potter | 333/23 |
| 2,777,998 | 1/1957 | Shepherd | 333/167 |
| 2,886,744 | 5/1959 | McNatt . | |
| 2,922,913 | 1/1960 | Cushman . | |
| 3,274,447 | 9/1966 | Nelson . | |
| 3,777,219 | 12/1973 | Winters . | |
| 3,863,111 | 1/1975 | Martzloff . | |
| 3,968,411 | 7/1976 | Mueller | 361/119 |
| 4,050,092 | 9/1977 | Simokat . | |
| 4,142,220 | 2/1979 | Lundsgaard . | |
| 4,158,869 | 6/1979 | Gilberts . | |

OTHER PUBLICATIONS

CQ Magazine, 7/1980, p. 23.
"Lightning Elimination Associates, Inc., Transient Eliminators".
"Aircraft Protection from Thunderstorm Discharges to Antennas", Electrical Eng. Mag., 10/53.
"Field Experience with Gas-Filled Protectors on Communications Lines", Lemieux, 7/63.
T11 Condensed Catalog and Price List, 11/1/78.
"RMS CATV Division–Superfit Series–Special Application Connectors".
Huber–Suhner Components Catalog, pp. 44–46.
"Cerberus Surge Protectors–Surge Voltages Rendered Harmless".

*Primary Examiner*—Harry E. Moose, Jr.
*Attorney, Agent, or Firm*—Townsend and Townsend

[57] ABSTRACT

A connector is provided for the suppression of electromagnetic impulses traveling along a radio frequency transmission line. Paired first and second electrical connectors are provided for being operatively interposed along the transmission line. First and second conductors are provided for electrically coupling the primary conductors and secondary conductors of one connector to their counterparts in the other paired connector. A discharge device or tube having a known breakdown voltage and a known capacitance is coupled between the first and second conductors. First and second capacitors are coupled in series respectively with the first and second conductors for blocking the flow of dc energy therethrough. The inductance of the first and second conductors are determined such that this inductance interacts with the capacitance of the discharge device, and the two capacitors and other stray capacitance of the combination thereof in order to produce a desired characteristic impedance, which is generally preferred to be equal to the characteristic impedance of the radio frequency transmission line, whereby the suppressor will dissipate electrical surges while representing a low standing wave ratio to radio frequency energy being transmitted along the line. The two capacitors prevent the flow of dc energy along the transmission line in order to protect the electronic equipment connected thereto.

In an alternate embodiment, a second capacitor and discharge device are utilized in order to provide additional differentiation and clamping of the impulse signal. An embodiment is also disclosed for inserting and removing a control signal along the center conductor.

23 Claims, 33 Drawing Figures

CONNECTOR FOR ELECTROMAGNETIC IMPULSE SUPPRESSION

This is a continuation in part application of Ser. No. 441,765 filed 11/15/82, which is now U.S. Pat. No. 4,409,637.

BACKGROUND OF THE INVENTION

I. FIELD OF THE INVENTION

The present invention relates to protective devices for suppressing short duration, high energy impulses, such as lightning strikes, which may occur along coaxial cables or other HF, VHF or UHF transmission lines. More particularly, the invention relates to the use of a discharge device in combination with connectors for being inserted in series with the transmission line.

II. DESCRIPTION OF THE PRIOR ART

The use of vacuum tubes in prior radio frequency transmitting and receiving equipment made them somewhat tolerant to nearby lightning strikes since the breakdown voltage of the tubes was relatively high and since the tubes would typically not be damaged unless there was a direct lightning strike on the antenna or the feedline. On the other hand, recent advances in solid state design technology have allowed transistors to replace tubes in most applications. The problems of surge protection or lightning strikes for transistorized receivers or transmitters is especially troublesome in view of the low breakdown voltages for typical solid state devices. Once this low breakdown voltage has been exceeded, the solid state device is no longer operative and must be replaced.

The cost of the lightning or surge protection has become more economical in view of the large cost of repairing this equipment. This cost factor becomes even more economical when the lightning or surge protection device can withstand multiple lightning strikes of reasonable intensity without the necessity of replacing the protective device or without distruction of any equipment attached thereto. However, these economies of lightning protection are not acceptable if the performance of the system in which the lightning protection device is used is degraded by the insertion of the protection device. Transmitting systems are of the greatest interest in this regard since the insertion loss and VSWR along the transmission line are somewhat critical at VHF and UHF frequencies.

In contrast to the prior art devices that did not propertly match the impedance of the transmission line, the present invention relates to a connector of the type which may be inserted into a length of coaxial radio frequency cable, or other HF, VHF or UHF transmission line, for controlling and dissipating the surge energy (such as lightning) traveling from the antenna side toward the receiver/transmitter side, while not presenting a high VSWR or insertion loss when viewed from the transmitter end toward the antenna end of the line. The capacitance of the discharge device used in the circuit, and other stray or distributed capacitances, are cuased to interact with distributed inductive reactance so that the characteristic impedance of the connector, when viewed as a lumped element circuit, will correspond to the characteristic impedance of the transmission line. Thus, the connector will be transparent to the transmitted RF signal, but will be effective in dissipating or shunting the electrical impulse traveling down the line.

SUMMARY OF THE INVENTION

This invention relates to an electrical surge suppressor for dissipating power surges along a radio frequency transmission line of the type having a primary and a secondary conductor and a known characteristic impedance. The suppressor includes paired first and second electrical connectors, each having primary and secondary conductors for being operatively interposed along the primary and secondary conductors of the transmission line. A discharge device is provided having a known breakdown voltage and a known capacitance between first and a second sections thereof. A first conductor is provided for electrically coupling the first section of the gas discharge device between the primary conductors of the first and second electrical connectors. A second conductor is provided for electrically coupling the second section of the gas discharge tube to the secondary conductors of the first and second electrical connectors. First and second capacitors are respectively inserted in series with the first and second conductors for blocking the flow of D.C. energy therethrough. The first and second conductors have known inductances that interact with the capacitance of the discharge device and the first and second capacitors and stray capacitances of the combination thereof in order to produce a desired characteristic impedance (typically that of the radio frequency cable), whereby the suppressor will dissipate electrical surges while representing a low standing wave ratio for radio frequency energy transmitted along the cable.

A groundplane is also disclosed in an alternate embodiment for reducing the length of the conductors and the physical size of the discharge device in an unshielded balanced embodiment. An embodiment for inserting and removing a control voltge from the center conductor of the coax transmission line is also

BRIEF DESCRIPTION OF THE DRAWINGS

Other objects, features and advantages of the present invention will be apparent from a study of the written description and the drawings in which.

Figure 1:
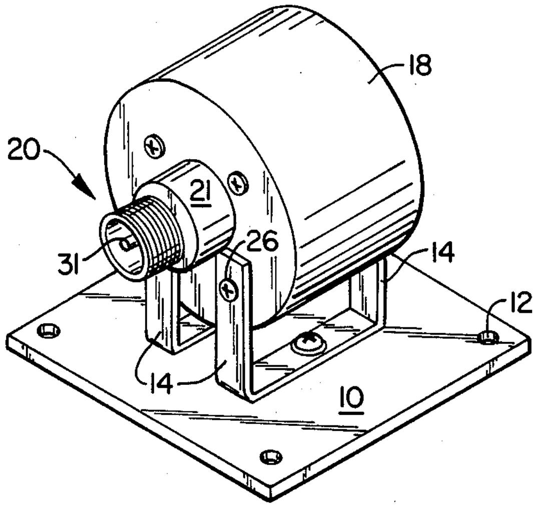
FIG. 1 illustrates a frontal perspective view of a first preferred embodiment of the connector for electromagnetic impulse suppression.

In the drawings, like reference numerals will refer to like parts throughout the several views of each of the embodiments of the present invention. However, variations and modifications may be effected without departing from the spirit and scope of the concept of the disclosure as defined by the appended claims. It should be observed that the elements and embodiments of the present invention have been illustrated in somewhat simplified form in each of the drawings and in the following specification in order to eliminate unnecessary and complicating details which would be apparent to one skilled in this art. Therefore, other specific forms and constructions of the invention will be equivalent to the embodiment described although departing somewhat from the exact appearance of the drawings.

TECHNICAL THEORY DISCUSSION

By utilizing some common fundamentals of electronic low pass filter-matching, a standard T or "π" network configuration can be calculated so as to utilize the capacitance of a gas tube or other discharge device as a partial or entire capacitor leg of the filter circuit. The unit would be impedance transparent for only a narrow group of RF frequencies and thus the efficiency of the tube or discharge device as a protector would be degraded.

Since a transmission line consists of series distributed inductors (herein known as L's) whose reactance value at any frequency exactly equals the reactance value of a plurality of shunt distributed capacitors (herein known as C's), the transmission line can be synthesized over a wide frequency range as consisting of lumped L's and C's.

If a "T" or "π" circuit is mirror-imaged below ground, and if the ground is then eliminated (such as in a balanced circuit), the circuit will be identical to the circuit of a synthesized lumped transmission line. By again utilizing the capacitance of a gas tube or discharge device as a partial or whole capacitor leg in the lumped transmission line, the discharge device will become an integral part of the adjacent section of the transmission line. Since transmission lines in general can be used from very low frequencies to microwave frequencies, the efficiency of the tube as a surge protection device is not degraded. Thus, it should now be apparent that the synthesized lumped element transmission line is a special application of the general T or π network circuit designs.

Since only one C value is of interest (that of the tube or the tube paralleled with another C), the synthesized lumped transmission line will therefore be segmented as a mirrored T configuration as opposed to the mirrored "π" configuration. This will eliminate the need for an additional C and will allow the gas tube or discharge device capacitance to be buffered on each side by only L's.

This section of a synthesized lumped transmission line can be made to present any characteristic impedance, as well as being either balanced or unbalanced, and may be constructed with either air or solid dielectric materials.

To calculate the required C value for any transmission line, the following formula can be used:

$$C = \frac{1.016\sqrt{K} \times 10^{-3}}{12Z_o} = \mu F/\text{inch}$$

where $Z_o$ is the desired characteristic impedance (typically the same as the transmission line) and K is the dielectric constant.

To calculate the required L value for any transmission line, the following formula can be used for the same values of Z and K:

$$L = \frac{1.016\, Z_o\sqrt{K} \times 10^{-3}}{12} = \mu H/\text{inch}$$

Figure 7:
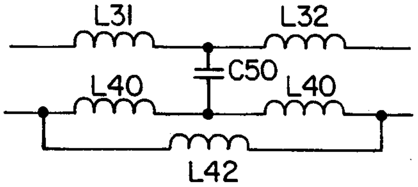
FIG. 7 illustrates the schematic lumped circuit constant elements and diagram for the theoretical reconstruction of the unshielded and unbalanced coaxial line version of the present invention illustrated generally in FIG. 1.

In the unbalanced unshielded type configuration shown in FIG. 7, the gas discharge tube may be mounted between two connectors for convenience. The center connector pins comprise L31 and L32, and the gas tube comprises C50 and is soldered to mounting screw L40. The main mounting screw L40 is of smaller diameter and longer in length than the center connector pins L31-32 and thus will have more inductance than required. Therefore, an additional screw of inductance L42 is added in parallel to reduce the total inductance value. This total value equals the calculated L value, as do L31 and L32 when added together. The formula for calculating these straight length inductances can be found in most engineering textbooks.

This ideal connector configuration typically shows no performance degredation because of its extreme short length when used in conjunction with the typical unbalanced coaxial transmission line, but only as long as conductive material (which upsets the inductive to capacitive ratio balance) is not brought within close proximity of the connector. In order to prevent this reactance imbalance, the unit should be housed in a plastic shell and a standoff mount should be used (which should also be used in the calculations of L). This standoff also provides a connection to ground so that the gas discharge tube can conduct the impulse to ground.

Figure 7A:
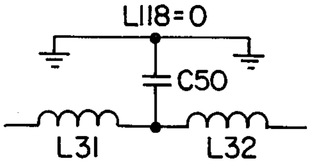
FIG. 7A illustrates the schematic lumped circuit constant elements and diagrams for the theoretical reconstruction of the shielded and unbalanced coaxial line version of the present invention illustrated in FIGS. 5 and 6.

In an unbalanced, metal enclosed, coaxial line configuration illustrated in FIG. 7A, the physical size of the tube causes the presence of additional stray C. This requires that the smallest dimension gas discharge tube should be used with low L standoffs. With a slight increase in the normal concentric size of the outer conductive shell, the inner to outer conductor size relationship is changed from the particular line characteristic impedance. This will cause an increase in L due to a decrease in distributed C. This is again restored to the desired impedance by inserting the gas discharge tube as a lumped capacitance value.

The following formula is useful for calculating the required C value for this coaxial line with relationship to the inside to outside diameters:

$$C = \frac{7.362\ K \times 10^{-6}}{12 \log_{10} D/d} = \mu\text{F/inch}$$

where D is the outside diameter, d is the inside diameter and K is the dielectric constant.

The following formula is useful for calculating the required L value for this coaxial line, as above:

$$L = 11.684\ (\log_{10} D/d) \times 10^{-3} = \mu H/\text{inch}$$

$$L = (140.208/12)\ (\log D/d) \times 10^{-3} = \mu H/\text{inch}$$

for the desired characteristic line impedance $Z_o = \sqrt{L/C}$

Figure 8:
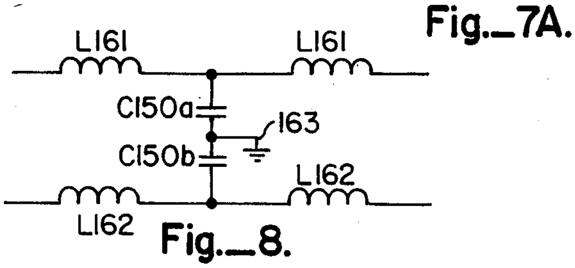
FIG. 8 illustrates the lumped circuit elements and schematic diagrams for the technical reconstruction of a balanced line unshielded and shielded version of the present invention.

Balanced transmission lines, either shielded or unshielded, can be treated in the same manner as previously mentioned for unbalanced lines. FIG. 8 illustrates a schematic diagram of a balanced, unshielded transmission line. Since the RF currents through capacitors C150*a* and C150*b* are equal and 180 degrees out of phase, there exists a virtual ground where they join, and this virtual ground may be grounded. If a three element gas tube is substituted for the capacitor C150, and the distance and/or dielectric material is changed such that the inductive and capacitive values balance to produce the $Z_o$ impedance, then the center element of the gas tube can be grounded for impulse protection. The three element gas tube can therefore be thought of as two capacitors C150*a* and C150*b* in series. The following formulae may be useful for calculating values for the unshielded balanced line:

$$C = \frac{3.681\ K \times 10^{-6}}{12 \log_{10} 2D/d} = \mu\text{F/inch}$$

$$L = \frac{0.28042 \log_{10} 2D/d}{12} = \mu\text{H/inch}$$

where the relationship $Z_o = \sqrt{L/C}$ is maintained for the desired characteristic line impedance, and where K is the dielectric constant, D is the center to center distance between conductors and d is the diameter of the conductors (both must be in the same units for these formulae).

A stand and a plastic enclosure are required for the same reasons as mentioned for the unbalanced unshielded version. For convenience, two simple 2-lug terminal strips may be used back to back and the three element gas tube soldered in place between them.

The shielded balanced transmission line may be conceptualized as a combination of the balanced line and the coaxial line. Because of the distributed capacitance to ground for both lines, the formulae are slightly more complex. Here, R will be substituted for 2D/d in the above formulae for simplicity.

$$C = \frac{3.681\ K}{12 \log_{10} R} \times 10^{-6} = \mu\text{F/inch}$$

and $$L = \frac{.28042 \log_{10} R}{12} = \mu\text{H/inch}$$

where $R = (2h/d)\ (1-(h/D^2)/(1+(h/D)^2)$ and K is the dielectric constant and h is the height above ground and where D and d are as above.

In these formulae $D >> d$ and $h >> d$, while maintaining the ratio of L to C in the formula $Z_o = \sqrt{L/C}$ for the desired line impedance.

For ease of construction, the balanced unit may be redesigned and used inside a conductive shell similar to the unbalanced coaxial shell. In any of the units, depending on the C value of the tube and the desired $Z_o$, the L values may be of a large value and thus warrant the use of discrete values of inductance (such as a coil or coiling of one or more conductors) in order to have ease of construction. Any discrete coil used should be analyzed carefully for the reactance values and for the rise time of the undesirable impulse.

Since a gas tube is somewhat power limited due to its limited heat dissipation factor, there is a need for fail-safe considerations. The unshielded types, both balanced and unbalanced, should be constructed such that the gas discharge tube is soldered in place generally in a somewhat horizontal position. This allows the tube, when heated by shunting impulse energy, to heat to the melting point of the solder before it disconnects itself and falls harmlessly away from its operative condition against the conductors.

The enclosed coaxial line configurations can handle more power since the outside shell can act as a heat sink. However, as with the open line configuration, the tube should also be oriented so as to disconnect itself at the melting point of the solder so that it will fall away.

In order to indicate that the tube has fallen in the fail-safe mode, the unbalanced shielded and unshielded type shells should be made translucent so that a visual or an optical sensor indication would reveal the situation. The enclosed coaxial types should have a small hole or an optical sensor which would not degrade performance. Both systems could utilize a system of monitoring for any change in VSWR as an additional failure indication.

In both instances, when the gas discharge tube disconnects, the surge protection will be discontinued. However, by cascading additional equal threshold surge protection units in the transmission line, protection can be continued since the tube closest to the impulse will typically become the first conductive path. As the temperature of the tube rises from impulse conduction, its conduction threshold will lower and thus insure that a path to ground will be available for the next impulse.

It must be noted that as a tube fails and decouples from the connectors, the additional protection from subsequent impulses can be provided by the cascade technique. However, once the gas discharge tube drops out of the circuit, the circuit is no longer transparent to RF signals and the VSWR and insertion losses will both increase substantially.

The RF power handling capabilities of the unit can be calculated since the voltage threshold versus response time of the gas tube is known and the transmission line impedance is also known. These calculations however, are only valid under matched conditions (VSWR=1 to 1). If this condition is not satisfied, the placement of the unit with regard to the standing wave will determine the RF handling capabilities.

The following embodiments of the present invention are practical applications of the preceeding theoretical considerations. However, it should be noted that while a gas discharge tube is used for purposes of illustration, other gaseous or solid state discharge devices can be substituted provided that proper construction adjustments are made as specified in the prior formulae.

DETAILED DESCRIPTION

A first embodiment of the connector for electromagnetic impulse suppression is illustrated generally in FIG. 1. While FIG. 1 illustrates the unbalanced or coaxial line version of the present invention, other embodiments for use with open line transmission systems will also be within the scope of the appended claims.

The connector for electromagnetic impulse suppression includes a base 10 manufactured of a metallic and conductive material for being coupled through apertures 12 to a grounded or other conductive surface. The base 10 includes a plurality of generally upstanding vertical supports 14 which are mechanically and electrically coupled to the base 10. The distended ends of these vertical supports 14 are coupled to the lower sections of a pair of electrical connectors illustrated generally as 20. The length of the vertical supports 14 are determined so as to provide a separation of approximately 1.00 inch between the center of the paired electrical connectors 20 and the base 10. This separation is important in order to minimize any stray capacitance between the various elements comprising the paired connectors and the other elements spaced therebetween. These vertical supports 14 also provide some distributed inductive reactance as previously discussed.

Figure 2:
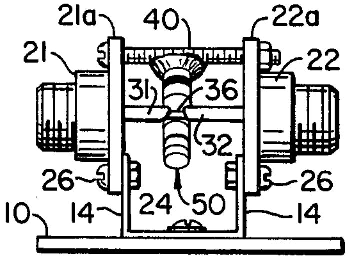
FIG. 2 illustrates a side elevation of the first preferred embodiment illustrated in FIG. 1 without the cover being attached thereto.
Figure 3:
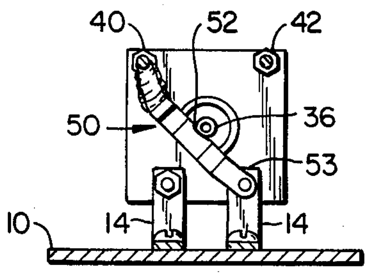
FIG. 3 illustrates an end partially sectioned view showing one connector and the gas discharge tube in the orientation envisioned by the first preferred embodiment without the cover being attached thereto.
Figure 4:
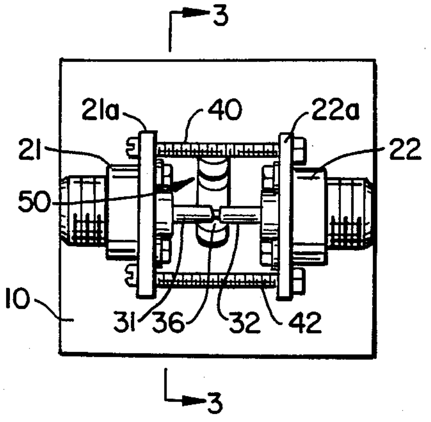
FIG. 4 is a top elevation view of the first preferred embodiment of the present invention without the cover being attached thereto.

As will be seen more clearly in FIGS. 2, 3 and 4, the paired electrical connectors 20 include a first electrical connector 21 and a second electrical connector 22 which, at least for 50 ohm coax, are typically Type-N coaxial connectors manufactured by Amphenol under Part No. 82-24. Connectors of this type have been chosen for low insertion loss at frequencies up to and exceeding 1,000 MHz. The generally upstanding vertical supports 14 are coupled to the lower group of two apertures 24 in the paired electrical connectors 20 by a plurality of bolt, nut and washer combinations 26.

The center conductors 31 and 32 respectively of the first electrical connector 21 and the second electrical connector 22, are disposed adjacent to each other and are electrically coupled through the use of a small center conductor shown generally as 36. The size of this center connecting conductor 36 will generally be determined by the inside diameter of the cylindrical bores located within the center conductors 31 and 32 of the connectors 21 and 22. This center connecting conductor 36 will typically be soldered to both the center conductors 31 and 32 in order to secure the separation therebetween. This separation is typically (for 50 ohms) on the order of 0.72 inches when measured from the inside surface 21*a* of the first electrical connector 21 to the inside surface 22*a* of the second electrical connector 22.

This distance is somewhat critical in that the length of the additional inductive separators communicating between the base surfaces 21*a* and 22*a* will be determined by the distance between the center conductors 31 and 32. Since the length of these additional inductive separators is critical to the overall lumped circuit element impedance of the connector and surge protector, these dimensions should be maintained or coordinated with the lumped circuit capacitance elements in accordance with the above-explained formulae.

While the center conductors 31 and 32, together with the center connecting conductor 36 form the first or primary inductor (see L31 and L32 in FIG. 7), a second circuit inductor (L40 in FIG. 7) is provided for coupling the second electrical conductors or shields of the paired electrical conductors 20. This second inductor has the form of a standard 1 $\frac{1}{8}$" 4-40 machine head screw, shown generally as 40, which communicates through the apertures in the flange mounting plates 21*a* and 22*a* of the respective connectors 21 and 22.

The diameter and length of this screw 40 are somewhat critical since at UHF frequencies at or near 1,000 MHz, the diameter and the length of the screw would substantially determine the inductance of the element. Since the cross-sectional diameter of the screw 40 is slightly smaller than the cross-sectional diameter of the center conductors 31 and 32, the inductance of the second inductor 40 is slightly larger than the inductance of the center conductors 31 and 32. Therefore, a second screw or supplemental second inductor 42 is secured through the apertures in the mounting flanges 21*a* and 22*a* of the connectors 21 and 22 for providing additional rigidity in the separation of these two connectors. Since the second screw 42 or supplemental inductor L42 is in parallel with the first screw 40, the total inductance of the two screws will be approximately one half of the inductance of a single one of the screws. This combination results in the inductive reactance of L40 equaling that of L31 and L32. It is this balancing, together with the chosen C value, that will substantially increase the frequency range at which the overall lump circuit elements will match the impedance of the transmission line coupled to the connectors 21 and 22.

As is more clearly illustrated in FIG. 3, a first end of a gas discharge tube 50 (or surge arrestor tube) is electrically and mechanically coupled to the center conductors 31 and 32 of the paired electrical connectors 21 and 22. This electrical and mechanical coupling is typically produced by soldering the middle section of the gas discharge tube 50 to the lower cylindrical surface of the center conductors 31 and 32 at a point generally adjacent to the center connecting conductor 36.

A second section of the gas discharge tube 50 is mechanically and electrically coupled to the first screw (second inductor) 40. Likewise, this coupling is typically accomplished by soldering an upper surface of the gas discharge tube 50 to a lower surface of the screw 40. The fact that the gas discharge tube 50 is coupled by soldering to the underneath surfaces of the center conductors 31 and 32 and the screw 40 is significant in that it is a characteristic of such gas discharge tubes that they will be required to dissipate as heat a part of the impulse energy which is conducted to ground through the device, thereby increasing in ambient temperature. In order to provide a fail-safe mode so that the gas discharge tube 50 will not fail in a continuously conducting mode, and thus short out the transmission line, the heat buildup within the gas discharge tube 50 will typically melt the solder connections thus allowing gravitational forces to disengage the gas discharge tube 50 from its connections with the first screw 40 and the center conductors 31 and 32. This disengagement will cause the gas discharge tube 50 to fall away from the conductors and thus prevent damage to the tube 50 or to the other circuit elements. Of course, when this gas discharge tube 50 decouples from the circuit elements, the main capacitance elements in the lump circuit analogy will have been removed, thus causing an aberration in the insertion loss and the VSWR along the transmission lines. While this increase in VSWR is not helpful for the transmitter attached to the transmission line, it is preferably to have this failure mode rather than to have a failed gas discharge tube continuously conducting and shorting out the transmission line.

Several of these impulse protector connectors may be arranged in a series or a cascade fashion in the transmission line. In this manner if the gas discharge tube 50 in one of the units becomes overheated and disengages from electrical communication between its circuit elements, the remaining units will nevertheless remain operative in order to absorb any electrical surges between the conductors.

In order to observe the normal coupling between the gas discharge tube 50, the first screw 40 and the center conductors 31 and 32, the cover 18 is typically manufactrured of a clear or partially transparent plexiglass or plastic material. This will allow visual inspection of the proper coupling of the gas discharge tube 50.

In this embodiment of the present invention it is envisioned that the gas discharge tube 50 will be of the type produced by TII INDUSTRIES INC. of 100 North Strong Avenue, Lindenhurst, N.Y. 11757, and designated as Model No. 11.

This particular gas discharge tube is a 3-element (of which only two elements are typically connected) design and has a firing or breakdown voltage of approximately 320 volts D.C. As soon as the voltage across the first and second sections of the gas discharge tube 50 exceeds this breakdown voltage, the rare gases within the tube will ionize and form a relatively low resistance path (or shunt) between the two sections of the tube, and therefore between the center conductors 31 and 32 and the first screw 40. Since these elements are coupled to the center conductor and braid elements of the coaxial transmission line, the electrical surge occurring on either of these circuit conductors will be essentially shorted to ground through the vertical supports 14 and the base 10.

This gas discharge tube 50 is substantially more tolerant to large electrical voltage peaks than semiconductor devices, but the terms discharge means or discharge device are intended to include both gas discharge tubes and functionally equivalent semiconductor devices (such as diodes) in applications such as those not concurrently requiring a high breakdown voltage, high surge current and low capacitance. Gas discharge tubes 50 of this type are capable of handling without distruction several impulses of the type which commonly occur in a single lightning strike. The use of rarified gasses within the discharge tubes substantially reduces the vaporization and oxidization of the elements within the tubes following the ionization of the gas therewithin. Furthermore, since the tubes 50 may be manufactured with precise gaps and with known gases therein, the precise breakdown voltage of the tubes may be carefully and predictably determined. This factor is important for choosing the proper power handling capabilities or breakdown voltages of the gas tubes 50 in accordance with the power handling requirements of the radio frequency transmission line, while placing an accurate limit upon the highest voltage to be allowed along the transmission line as a result of power surges or lightining strikes.

As was previously discussed, since solid state devices in transmitters and receivers coupled to the transmission line are very unforgiving of these large power surges or lightning strikes, the accurate control of the maximum impulse voltage across the lines is most important and the need for predictability is obvious. While the TII Model 11 gas discharge tube has been illustrated in the previously discussed embodiment of the present invention, other models, namely the TII Model 37 and Model 46 gas discharge tubes, may also be used. Taking the TII Model 11 3-electrode gas tube as an example, the maximum D.C. arc voltage under breakdown conditions (glow condition) is approximately 30 volts. The gas discharge tube is advertised as being expected to survive 2,000 surges of 10/1000 waveforms at approximately 1,000 peak amperes each.

For a typical length of 50 ohm coaxial cable such as RG-8U or RG-58U, and for the typical Model 11 gas discharge tube capacitance value of approximately 1.7 picofarads, and for a K value of 1 (corresponding to the device being suspended in air), the value of the lumped circuit conductor inductance L required for the entire connector assembly to represent a 50 ohm impedance would be approximately 4.23 nanohenries per inch. By using the proper spacing between elements 21 and 22, the length of elements 31 and 32 will each yield the 4.23 nanohenries per inch necessary for elements L31 and L32. Using two $1\frac{1}{8}''\times 4$-40 screws 40 and 42 as the inductors L40 and L42, the value of the resulting inductance is approximately 4.23 nanohenries per inch. Therefore, as constructed and illustrated in FIGS. 2, 3 and 4, the electromagnetic impulse suppressor will have a characteristic impedance of approximately 50 ohms for electrical energy from VLF to UHF frequencies.

Experimental data of this embodiment of the present invention indicates that tube insertion losses (exclusive of connector losses) on the order of 0.1 db at 400 MHz and 0.18 db at 1,000 MHz are obtainable in test units. These insertion losses typically will decrease to below 0.01 db at frequencies below 200 MHz. VSWR values on the order of 1.1:1 at 1,000 MHz and 1.01:1 at 200 MHz are obtainable from production units. It will be obvious that these figures for insertion loss and VSWR are substantially below other available commercial units. As previously explained, most other commercial units are unable to be operated with reasonable insertion losses and VSWR figures above 300 MHz. In contrast, the present units are well-suited for operation up to and exceeding 1,000 MHz.

Figure 5:
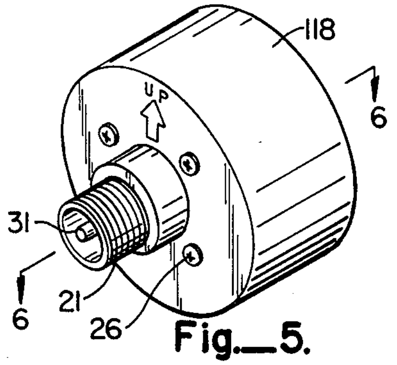
FIG. 5 illustrates a second preferred embodiment of the present invention which utilizes a metallic shield rather than the non-metallic shield utilized in the first preferred embodiment.
Figure 6:
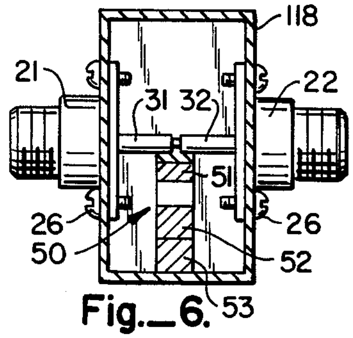
FIG. 6 illustrates a partially cross-sectioned top view of the second preferred embodiment taken along the section lines 6—6 of FIG. 5.

A second embodiment of the present invention corresponding to an unbalanced shielded version is illustrated generally in FIGS. 5 and 6. The second embodiment differs from the first embodiment illustrated in FIGS. 1 through 4 in that no base 10, vertial supports 14 or non-metallic cover 18 are provided. Instead, the second embodiment is provided with a metallic cover 118. The first and second electrical connectors 21 and 22 are coupled to the planar surfaces of the metallic cover 118 in a manner similar to the coupling with the plates 21*a* and 22*a* of the first embodiment. The center conductors 31 and 32 of the electrical connectors 21 and 22 are also electrically and mechanically coupled (0.3 inches in diameter) as in the first embodiment. However, in view of the large surface area and the low inductance of the metallic cover 118, separate screws for additional inductors 40 and 42 are not required as in the first embodiment. Instead, the entire surface of the metallic cover 118 acts as a conductor which unbalances the circuit and shields the other circuit members. For a typical 50 ohm unit, the size of the metallic cover 118 is approximately 1.50 inches in outside diameter, 1 inch in length and 1/32 inches in thickness. These preferred sizes and dimensions produce an inductance which is approximately the same as the inductances 40 and 42 in the first preferred embodiment.

In the second embodiment as illustrated in FIG. 6, the gas discharge tube 50 has a first section 51 thereof coupled directly to the center conductors 31 and 32 and a second section 52 (through a standoff 52) thereof coupled to the inside circumferential surface of the metallic cover 118. As in the case of the first embodiment, the gas discharge tube 50 is soldered to both the center conductors 31 and 32 and to the metallic cover 118. In this manner when the heat dissipated by the conducting gas discharge tube 50 raises the temperature beyond the melting point of the solder used in the connections, the solder will melt and the gas discharge tube will be drawn by gravitational forces away from the center conductors 31 and 32. A mount similar to the first embodiment may be used for proper orientation and grounding of the tube 50. It should be pointed out that a structure of this type may not be required since the coax and its connectors could generally support and orient the tube. The grounding will depend on the system installation and type of coax. However, for ease of installation a stand similar to the supports 124 of the first embodiment would appear to be best suited.

Figure 9:
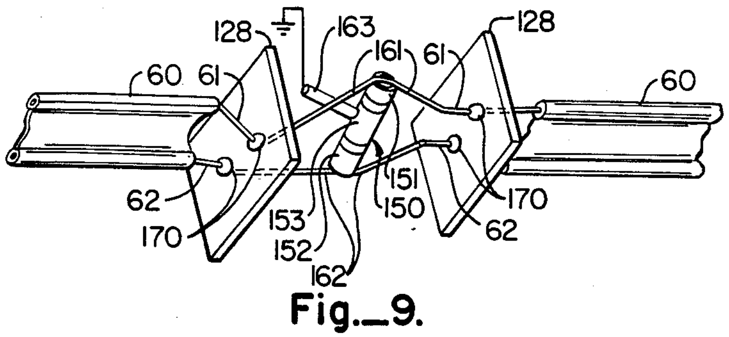
FIG. 9 illustrates a bottom perspective view of an alternate preferred embodiment of the present invention which is specifically designed for use with balanced open line transmission cables.

With reference to FIG. 9, a balanced line version of the present invention is illustrated as being interposed along a length of typical 150 ohm twin-lead transmission line 60. A first conductor 61 and a second conductor 62 of the twin-lead transmission line 60 are routed through insulators 170 contained in two parallel plates 128 which represent the shortened planar surfaces of a non-metallic cover 128 similar to the non-metallic cover 18 of the first embodiment. Each of these circuit conductors 61 and 62 are extended into electrical communication with the corresponding conductor on the adjacent piece of transmission line buy a conductor 161 and 162 respectively. The length and diameter of the conductors 161 and 162 are typically chosen in accordance with the inductance and impedance formulae which have been previously discussed. These inductors, depending on the formulae, may consist of actual coils for some impedances.

A gas discharge tube 150 includes a first end 151 which is coupled to one of the circuit conductors 161 and a second end thereof 152 coupled to the other circuit conductor 162. The center portion of the gas discharge tube 153 is coupled through a relatively large grounding strap 163 to ground potential. This ground potential may be provided through generally low inductance upstanding supports and a base similar to the same elements 14 and 10 in the first embodiment illustrated in FIG. 1.

The electrical schematic diagram of the equivalent lumped circuit elements for the balanced line configuration of the present invention is illustrated generally in FIG. 8. The two upper inductors L161 correspond to the circuit conductor 161 which couples together the first circuit conductors within the twin-lead transmission line 60, while the lower inductors L162 comprise the circuit conductor 162 which couples together the second conductors within the twin-lead transmission line 60. The capacitor C150 comprises the two capacitive elements within the 3-element gas discharge tube 150. The values and interaction between each of these lumped circuit elements has been previously discussed in accordance with the formulae mentioned above.

For a typical 150 ohm impedance balanced line, the values of L161 and L162 would be approximately 12.7 nanohenries per inch. Thus, L161 and L162 could be manufactured of 0.125 inch diameter wire having a length of approximately 1.25 inches. The TII gas tube Model 11 (element 150) is soldered into place as illustrated in FIG. 9. This gas tube 150 has an end-to-end capacitance of approximately 0.7 picofarads. The end planar elements 128 would be spaced apart by approximately 1 inch so as to provide sufficient separation for the inclusion of the gas tube 150.

With continuing reference to FIG. 9, a balanced line shielded version of this alternate embodiment would be similar to the unshielded version with the exception that a metallic shell, similar to the one illustrated as 118 in FIG. 5, would surround the basic balanced configuration. The size of this metallic shell and the new L values would be calculated in accordance with the formulae described previously. The electrical schematic diagram for the balanced shielded embodiment would also be the same as the balanced version shown in FIG. 8.

Typically, the balanced and shielded embodiment would be interchangeable with the balanced unshielded embodiment, and the unbalanced and unshielded embodiment would be interchangeable with the unbalanced shielded embodiment. One major advantage of the shielded embodiment is that any conductive objects which are in close proximity to the connectors 21 and 22 will not cause a significant unbalancing of the impedance through the device primarily due to stray capacitance.

This isolation from nearby conductive objects, as was previously discussed, is the primary reason for utilizing the base 10 and the vertical supports 14 of the first embodiment. Also, as was previously discussed, the vertical supports 14 and the base 10 provide a secondary grounding function for providing a more direct circuit conduction of the impulse voltage to ground, rather than depending upon the conduction of the impulse down the grounded or shielded portion of the cable. The lower material costs and the superior grounding features of the first embodiment as illustrated in FIG. 1 make it a more preferrable embodiment for normal coaxial cable applications.

These embodiments of the present invention may now be distinguished from the prior art references which have already been discussed. First, none of the prior art references utilize a matching network or other impedance sensitive designs which attempt to match the impedance of the mounting devices, or other circuit elements which support or are connected to the gas discharge tube, in order to minimize VSWR and insertion losses. This should be contrasted with the present invention in which the primary structural considerations for mounting the gas discharge tube directly relate to the values of the equivalent lump circuit elements for inductance and capacitance which are required in order to maintain the same effective characteristic impedance for the connector as for the transmission line with which it is used.

Secondly, none of the prior art references discuss applications for impulse suppressor connectors which extend in frequencies up to and beyond 1,000 MHz. Most of the prior art impulse protection devices are limited by the inductance and capacitance of their constituent elements to operate at frequency ranges below 300 MHz (with acceptable VSWR and insertion loss figures). Thirdly, the present invention is designed for use with high-powered VLF to UHF transmission systems and are not limited in use with VHF or UHF receiving systems as with prior art designs.

In the claims the "discharge means" is described as having a known breakdown voltage and a known capacitance between the operative elements thereof. In the preferred embodiment this "discharge means" is defined as a gas discharge tube. This device has a known capacitance (usually small) and a breakdown voltage that is relatively constant and high enough not to break down under voltages typically encountered on high power transmission lines. As stated in the prior art summary, commonly available solid state "discharge means" devices that have sufficiently high breakdown voltages and high surge current handling capabilities also have a capacitance value which is normally too high for proper operation near the upper frequency limit (1000 MHz) of the present preferred embodiment. However, the term "discharge means" could include any device, whether gas discharge tube or solid state device, having a known breakdown voltage and a known capacitance (assuming the capacity would be within the acceptable range defined by the specified formulae).

IMPROVEMENTS TO ORIGINAL EMBODIMENTS

Two additional problems have been identified recently and solutions are proposed herein. The first problem relates to the effect known as "crowbar" which occurs when an electrical impulse, such as lightning or EMP, strikes the transmission line. With reference to FIGS. 6 and 7A, this electrical energy will be transmitted down the transmission line until it reaches the discharge device 50, typically a gas discharge tube for the purposes of the present discussion (although semiconductor devices would have generally the same problem was will be discussed subsequently). As the impulse energy reaches and turns on the gas discharge tube 50, the "on" voltage drop across the tube 50 will be approximately 20 to 30 volts. For a typical lightning surge, approximately 40 microseconds may elapse before conditions allow for the impulse voltage to go below this voltage and turn "off" the gas discharge tube. During this time the voltage across the gas discharge tube 50 will represent nearly an ideal voltage source capable of producing extremely large currents into the impedance represented by the radio receiver or transmitter at the other end of the transmission line. Since the semiconductor devices in the receiver and transmitter can easily be destroyed by this 20–30 volts, it is important that some additional means of protection be provided.

Even if polycrystalline materials such as MOVS, or Zener diodes, or other similar solid state devices are substituted for the gas discharge tube 50, the "crowbar effect" is still apparent, even though these devises do not crowbar but instead limit the voltage by a clamping method. As with the gas discharge tubes, the voltage drop across the MOV is not insignificant. This constant voltage source is capable of producing high currents during this period of time which can likewise destroy other semiconductor devices in the receiver and transmitter at the end of the transmission line.

If a Zener diode is utilized for the discharge device 50, the "on" voltage could be less than the 20–30 volts of the gas tube depending on the value of the Zener chosen. However, even a low Zener voltage will provide a constant voltage of high current capacity that could be capable of destroying lower voltage semiconductor devices and other components in the transmitter and receiver at the other end of the transmission line.

An additional requirement of the impulse suppressor described herein is that it must operate independently of whatever load or type of equipment may be placed along either end of the radio frequency transmission line. For example, if the impulse suppressor is utilized in a radio frequency transmission line that is terminated in a shunt fed cavity that has given amounts of inductance and stray capacitance, then during the lightning impulse the cavity can act as a short circuit in the 0 to 5 MHz frequency range. Since the cavity will act like a short circuit, it is unlikely that the voltage across the discharge device will rise high enough to place the voltage sensitive gas tube in the conducting mode. Under these circumstances it would be possible for the lightning impulse to destroy the cavity or some other part of the circuitry before the discharge device has its intended effect.

Under these circumstances it may be desirable to incorporate improvements into the first embodiment of the present invention in order to solve these problems. A series capacitor may be inserted in the center conductor of the transmission line in order to block D.C. current flowing therethrough prior to the turnon of the discharge device. However, this solution brings about its own problems that must be considered and solved. For example, if the capacitor and the attached leads include appreciable inductance at RF frequencies (especially near the upper 1,000 MHz limit) and the transmission line is expected to carry 100 to 300 watts of transmitter power, then the series capacitor can produce unacceptably large losses and VSWR by dissipating power, melting or even disintegrating.

In the present embodiment, a suitable series capacitor is constructed of an NPO material and is manufactured by Johanson Dielectric, bearing the Model No. 202H42N471ZP4 or 302H42N151ZP4 or 302H46N471ZP4. This is a chip capacitor that has no leads, but instead has material on the side of the ceramic chip that is used for soldering contact. The breakdown voltage of the capacitor must be larger than the impulse voltage appearing across the discharge device prior to conduction. Furthermore, the reactance of the capacitor must be small at the highest frequency of operation so that insertion losses are minimized.

Figure 10:
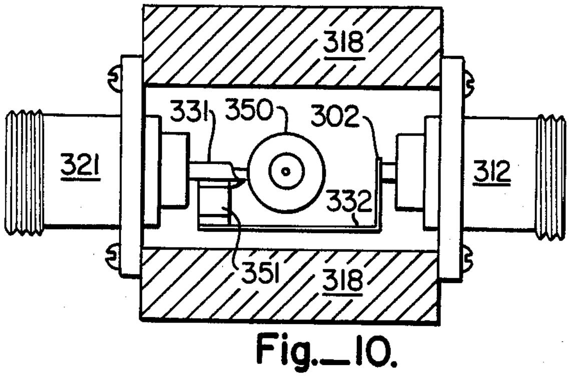
FIG. 10 illustrates a top sectioned view of an unbalanced shielded embodiment of the present invention which includes a series D.C. blocking capacitor.
Figure 11:
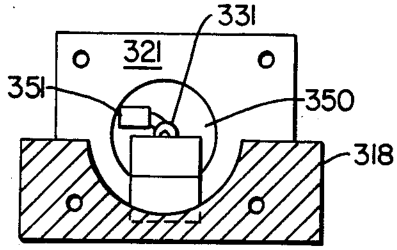
FIG. 11 illustrates a front sectioned view of the unbalanced shielded embodiment of FIG. 10.
Figure 12:
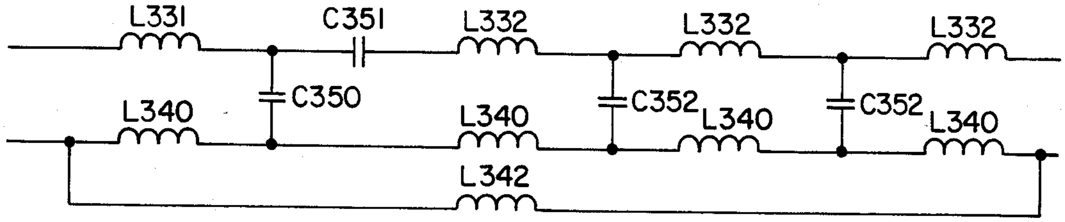
FIG. 12 illustrates a lumped element circuit diagram of the unbalanced shielded embodiment of FIGS. 10 and 11.

With specific reference to the top sectioned view of FIG. 10 and the front sectioned view of FIG. 11, the chip capacitor 351 of NPO material is connected in series with the center conductor 331 of a first connector 321 using the techniques outlined in the previous discussions of prior embodiments. A first side **51*a* of the chip capacitor 351 is soldered to the connector tip 331, which also has the first section 350*a* of a gas tube 350 attached thereto. The opposite end 350*b* of the gas tube 350 is coupled to the conductive support structure 322. The capacitance of the chip capacitor 351 is represented as C351 in the equivalent schematic diagram shown in FIG. 12**.

The other side **351*b* of the chip capacitor 351 is soldered to a length of copper braid 332 approximately 1 inch in length and 0.15 inches in width. This braid constitutes inductor L332 in the schemetic diagram illustrated in FIG. 12. This braid 332 is positioned approximately 0.05 inches from the inside cavity wall 318 for a length of approximately 0.65 to 0.7 inches. This separation between the braid 332 and the wall 318 will provide the distributed capacitance C352. The braid 332 is then bent at a right angle and soldered to the center conductor 302 of a second connector 312. It is anticipated that this second connector 312 would be used to connect to the electronic equipment, since the capacitor 351** should be electrically placed between the equipment and the gas tube in order to block the voltage impulse and protect the electronic equipment.

It should be apparent that the inductive value of the braid 332 (designated as L332) becomes part of the total inductance L32 as illustrated in the schematic diagram of the first embodiment (see FIG. 7). In a similar manner, the distributed capacitance C352 must be balanced with the inductance L332 in order to match the characteristic impedance of the transmission line. This matching procedure can be conducted using the formulae which have been previously discussed with respect to the unbalanced shielded embodiment shown in FIG. 12.

A second improvement relates to the 150 to 300 ohm embodiment which was described in FIGS. 8 and 9 in the present application. When the 150 ohm version is scaled upwardly to 300 ohms, the separation between the two transmission line conductors (161 and 162 in FIGS. 8 and 9) must be increased. The separation between end plates 128 must also be increased as the impedance increases. Furthermore, the length of the three element gas discharge device 150 must be increased to approximately 4 inches (the separation between the end elements 151 and 152 as illustrated in FIG. 9). Three element gas tubes 150 have these dimensions are not commercially manufactured, and it would be prohibitively expensive to have one specially manufactured for this limited purpose. It would not be advisable to add mechanical or electrical lengthening arms to the ends 151 and 152 of the gas discharge device 150 in view of the extra inductance which would be added. In view of these problems, and with the objective of reducing the size, weight, and complexity of the 300 ohm impulse suppressor while maintaining the same fundamental relationships among the electrical elements as heretofore specified, the following improved version will now be described.

Figure 13:
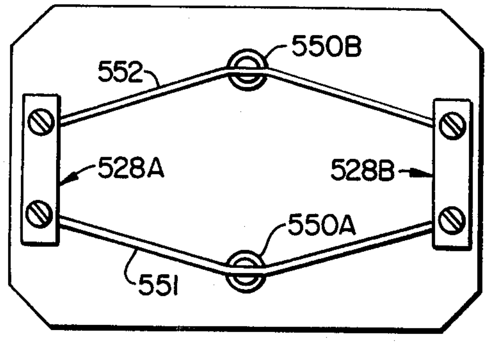
FIG. 13 illustrates a top sectioned view of an unshielded and balanced line embodiment of the present invention.
Figure 14:
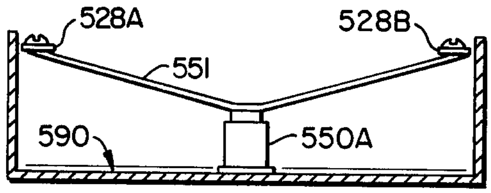
FIG. 14 illustrates an end sectioned view of the unshielded and balanced line embodiment of FIG. 13.

With reference to the top view shown in FIG. 13 and the side view shown in FIG. 14, a metallic conductive groundplane 590 having dimensions of approximately 3.63 inches in length and 2.5 inches in width is provided. Two 2 element gas discharge tubes **550*a* and 550*b* are mounted vertically near the center point of the groundplane 590. Two screw terminals 528*a* and 528*b* are located adjacent to the ends of the groundplane 590 but are spaced vertically therefrom by a approximately 0.8 inches. The screw terminals 528 are provided for connecting with the first and second conductors of the 300 ohm transmission line 60 (not shown in FIGS. 13 and 14). The corresponding screws on terminals 528*a* and 528*b* are coupled with the top section of gas discharge tube 550*a* by lengths of 17 guage wire (0.045 inch diameter). The total length of wire 561 is 3.65 inches, with the gas discharge tube 550*a* being located generally at the midpoint thereof. In a similar manner, a 3.65 inch long piece of 17 guage wire is used to connect corresponding screws on terminals 528*a* and 528*b* with the top section of gas discharge tube 550*b*. Gas discharge tubes 550*a*** and *b* are typical two element gas discharge tubes manufactured by TII under Model No. 37B. The typical breakdown voltage for these tubes is 320 volts and the typical capacitance between operative elements is 0.87 picofarads.

With specific reference to FIG. 14, it should be noted that the typical height of the gas discharge tubes **550*a*** and *b* is only approximately 0.5 inches, whereas the screw terminals **528*a*** and *b* are displaced approximately 0.8 inches above the groundplane 590. Therefore, there is a height differential of approximately 0.3 inches between the top of the gas tubes **550*a*** and *b* and the bottom of the terminals **528*a*** and *b*. Under these circumstances the average separation between the transmission line wire 561 and the groundplane 590 (as well as transmission line wire 562 and groundplane 590) is approximately 0.65 inches. If the distance between the gas discharge tubes **550*a*** and *b* is chosen to be approximately 1.5 inches, then it can be calculated that the characteristic impedance of the surge suppressor shown in FIGS. 13 and 14 is approximately 300 ohms.

A careful review of the prior discussion with regard to the balanced line embodiment illustrated generally in FIG. 9 will indicate that the use of the groundplane 590 has allowed certain dimensions for this new embodiment to be substantially reduced. The theoretical derivations of the formulae used to determine the effective impedance of the embodiment illustrated in FIGS. 13 and 14 are very similar to the formulae used to describe the characteristic impedance of the shielded version of the impulse suppressor as described previously (with height being substituted in lieu of diameter).

The following formulae will be suitable for determining dimensions and construction perameters for this embodiment:

$$C = \left[ \frac{3.681\ K}{12 \log_{10} R} \right] \times 10^{-6} = \mu F/\text{inch}$$

where K is the dielectric constant and R is $$R = (2A/d)\sqrt{1 + (A/2h)^2}$$

and where A is the center to center distance in inches betwen the two wires, d is the diameter of the wires and h is the height above the groundplane (foil), and $$L = \frac{.28042}{12} \log_{10} R = \mu\text{H/inch}$$

where R is as above.

Of course, the DC blocking capacitor which was previously discussed with reference to the coaxial or unbalanced line embodiment can also be inserted along conductors 561 and 562. It would be preferrable to place the blocking capacitors between the gas discharge tube and the receiver/transmitter termination for the reasons previously discussed. The size of the capacitors and the type of material used for the capacitors are also the same as were discussed with regard to the unbalanced line embodiments.

It should be noted that the groundplane concept as discussed above also could be utilized with regard to three element gas discharge tubes of the type and with the construction described with reference to FIG. 9.

The proximity of the groundplane to the transmission line conductors reduces the size so as to be in the range which is more compatible with that of the 150 ohm transmission line. While it cannot be accurately stated that the groundplane is used to "match" the characteristic impedance of the transmission line, it can be correctly stated that the groundplane becomes an integral part of the electrical makeup of the transmission line and thus allows the physical size to become reduced for a given impedance.

These embodiments of the present invention have been generally described as using a gas discharge tube for the discharge device. It has been explained that semiconductor devices could be substituted for the gas discharge tube under proper design situations, but at the present time the inventor is not aware of any semiconductor device that would have the required breakdown voltage, low resistance, high current surge capabilities and low capacitance characteristics similar to those of the gas discharge tube required by the present invention for operation at high power levels and at frequencies approaching 1,000 MHz. At the present time the state of the art in semiconductor devices can achieve a low to medium breakdown voltage (on the order of 1.33 v to 250 volts), a relatively high capacitance (a minimum of approximately 130 picofarads) and a relatively low power dissipation (on the order of 15 KW/uS peak). However, these all of these characteristics do not occur simultaneously in the same device.

At the present state of the art, the current conducting capacity (internal resistance during conduction) and capacitance values represent a tradeoff. If the surface area of the semiconductor junction is made sufficiently large to handle the large surge currents, then the capacitance value for the semiconductor device becomes extremely large. Typically these semiconductor devices also have a breakdown voltage (equal to their "on" voltage) that would have to be higher than the rf signal voltage occuring along the transmission line. This is not the case for a typical 500 volt gas tube that, because of its "crowbar" characteristic, has an "on" voltage in the 20–30 volt range (arc voltage).

It may be possible under certain design criteria to cascade the semiconductor diodes in order to increase the combined breakdown voltage of the diode string. Placing the diodes in series furthermore reduces the total capacitance of the diode string to a more manageable level. Unfortunately, the series coupling of the diodes substantially increasaes the effective resistance (during the "on" state) and therefore substantially reduces the current handling capability of the diode string below that necessary for handling lightning or EMP surge currents.

While these apparently mutually exclusive design objectives have not yet been reached in a single semiconductor device, it may be possible to use existing diodes (typically a model No. GHV-8, manufactured by General Semiconductor Industries of Tempe, Ariz.) in situations where low power is being transmitted in the high frequency (HF) spectrum.

For example, it is possible to design a hybrid impulse suppressor device using the previously explained concepts by combining the advantages of the gas discharge tubes and the presently available semiconductor devices. With specific reference to FIG. 15, an unbalanced and shielded version of the present invention is illustrated in schematic lumped circuit element form in the same general manner as FIG. 7A. However, in the present case the single gas discharge tube (previously C50) has been replaced with a semiconductor diode C650 that is placed between the electrical inductances L631 and L632 (corresponding to L31 and L32 in the prior discussions). Also, dual element gas discharge devices (typically Reliable Electric Co. Model SR—90L) have been placed adjacent the connectors so as to be located substantially beyond the lumped inductance values L631 and L632.

One advantage of this new embodiment is that it is essentially bidirectional, meaning that it will respond equally well to an energy surge coming from either direction. The semiconductor diode 650 would allow the device to begin shunting the electrical energy from the center conductor to ground potential at a relatively low voltage. By adjusting L631 and L632 in accordance with the prior teachings, the characteristic impedance of the impulse suppressor can be matched to that of the transmission line. Furthermore, the gas discharge tubes 651 and 652 will provide additional current handling capacity when the surge voltage exceeds their turn on or ionization voltage.

For example, if the gas discharge tubes 651 and 652 were 90 volt tubes capable of handling 5,000 amps and if the semiconductor device 650 had a turn on voltage on the order of 5 to 12 volts, then small inductors in series with the input or output lines to balance the capacitance of the gas discharge tubes 651 and 652 would be unnecessary. The capacitance values for 651 and 652 would be relatively insignificant compared to the large capacitance of semiconductor device 650, which will probably determine the upper frequency range of the suppressor and the operative values of L631 and L632.

The relatively larger value of the inductors L631 and L632 (when compared to the embodiments discussed earlier) will have several advantages. The larger inductance will slow down and limit the surge current into the semiconductor device. This L di/dt voltage drop helps on very fast rise time pulses in order to allow the voltage across the discharge tubes C651 (or C652 as appropriate) to rise high enough and quickly enough to enable the gas tube to assist the diode C650 in current shunting. The additional large inductor L632, located in series with the center conductor, will further serve to limit the surge current as well as filter any high frequency components which are generated by the gas tube "crowbar" action and the clamping action of the semiconductor device. This filtering takes place because when the shunting elements (gas tube and/or semiconductor) are active, there is a momentary disruption of the normal operating impedance of the unit with respect to the transmission line impedance. The gas tube C652 furthest down the transmission line from the source of the electrical surges will probably not go into conduction.

Figure 15:
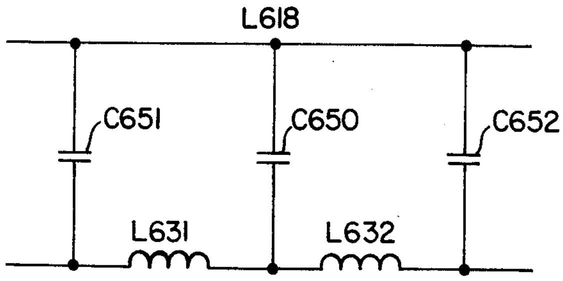
FIG. 15 illustrates the lumped circuit equivalent schematic for a hybrid version of an unbalanced shielded impulse suppressor.

Therefore, the bidirectional nature of the surge protector disclosed in FIG. 15 can be used to protect sensitive electronic equipment located at either end of a long unbalanced transmission line. This type of device would be suitable for use with high frequency transmission equipment, high frequency modems, etc.

Figure 16:
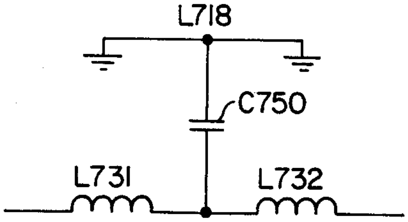
FIG. 16 illustrates a solid state embodiment of an unbalanced shielded impulse suppressor.

By extending the discussion of the foregoing device into a completely solid state embodiment as illustrated in FIG. 16, a semiconductor device 750 (represented by the capacitance C750) is inserted into the unbalanced shielded embodiment of the device previously illustrated in FIGS. 5 and 6 and shown in the lumped circuit diagram of FIG. *7a*. The inductors L731 and L732 are calculated in accordance with the previous discussions for the unbalanced shielded embodiments using gas discharge tubes. The capacitance C750 for the semiconductor device will be much larger than the corresponding capacitance for a gas discharge tube. Therefore, the value of the inductors L731 and L732 must be increased accordingly. This can be accomplished by increasing the length of inductor L731 (that corresponds to the center conductor 31 illustrated in FIG. 6) and the length of the inductor L732 (corresponding to the center conductor 32 in FIG. 6). This adjustment can also be accomplished by adjusting the ratio of the outside diameter of the shielding cavity (shown as 118 in FIG. 6 which corresponds to L718 in FIG. 16) with respect to the diameter of the conductors 731 and 732 in FIG. 16 (which correspond to conductors 31 and 32 shown in FIG. 6). These adjustments can be made in conjunction with each other or separately in accordance with the previously discussed formulae for the unbalanced shielded embodiment of the invention. For some semiconductor device (C750) having unusually large capacitance values, it may be advisable to include an actual inductor circuit element in order supplement the inductance provided by L731 and L732. These additional inductors may comprise normal wire coils (with the stray capacitance taken into account) inserted in series with the center conductor (for example elements 31 and 32 illustrated in FIG. 6).

For the embodiment illustrated schematically in FIG. 16, the semiconductor device 750 would correspond to a transorb device (or mosorb device) such as Model No. GHV-7 or GHV-8 manufactured by General Semiconductor Industries of Tempe, Ariz. The typical capacitance of this device is on the order of 130 picofarads, which would typically limit the upper frequency limit to approximately 30 MHz for a 50 ohm impulse suppression device. The breakdown voltage of the device is on the order of 5 volts which would limit the transmission of RF power along the transmission line to approximately 0.5 to 0.25 watts. As was previously discussed, the power limitation of 0.5 watts for a 50 ohm system is substantially below the 1000 watt transmission capability of a similar unit using a gas tube device. At the upper frequency limit of 1000 MHz, a gas tube type device would typically have a power rating of 125 watts. However, in the future when solid state devices are available with lower capacitance, higher breakdown voltages and higher current capabilities, then the solid state embodiment of the present invention designed in accordance with these teachings should be capable of approaching, if not surpassing, the embodiments utilizing gas discharge tubes.

FURTHER IMPROVEMENTS TO ORIGINAL EMBODIMENTS

Figure 17A:
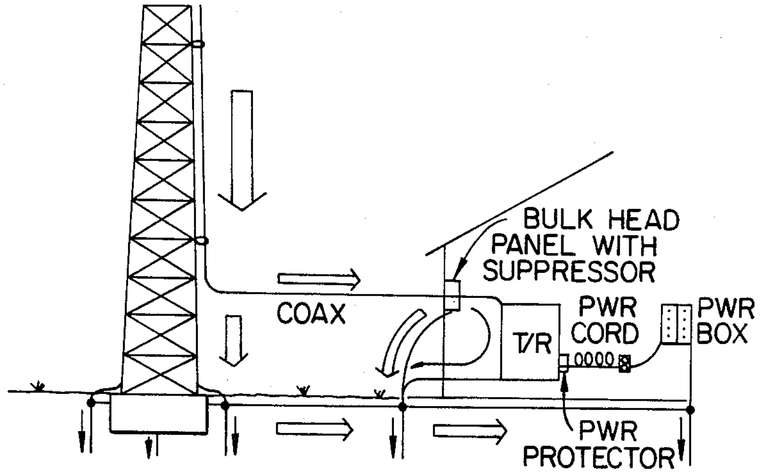
FIG. 17A is a pictorial schematic representation of a tower having an antenna coaxial line grounded at several points therealong.

With reference to FIG. 17A, most towers are made of sections of conductive material that will normally display approximately one ohm of total series resistance to an impulse. Therefore, a 50 percent occurrence strike of 18 kiloamps will cause approximately 18 kilovolts between the top and the bottom of the tower. If the coax shield is grounded to the tower top and again to the bottom of the tower, then the major impulse currents will travel along the low resistance coax path instead of through the resistance of the tower section. Even if the coax is grounded at each section of the tower, the coax shield currents will not be substantially reduced.

These currents on the coax will propagate differently within the shield and the inner conductor. The shield current will be affected by the magnetic field of the nearby tower current as well as by the current that may be present on the center conductor. The center conductor, however, will only be affected by the shield current and the dielectric constant of the coaxial insulating material. The different propagation velocities and the different ohmic resistances will cause, at any instant of time during the strike, a voltage differential between the center conductor and the shield along the cables. The different propagation velocities will cause the impulse current traveling along the shield to arrive at the ground equipment end of the coax before the impulse traveling along the center conductor. At the base of the tower the shield will be attached to a ground point which will disperse the electrical charge of the impulse into the grounding system. However, the center conductor will be connected to a load or other impedance and will be at some higher potential. If this potential difference is coupled to a shunt fed cavity, then it will be converted into high currents with large magnetic fields. These effects can place great stresses on the shunt feed, either moving it or breaking its solder bonds. Isolators also can be damaged by this potential difference. The large current induced magnetic fields can reorient the ferrite and gradually increase the insertion loss of the device.

It may be impossible to eliminate all of the currents on the coax, but by bonding across each leg joint the tower will become a better conductor than the coax and thus will reduce the proportion of the current on the coax. Unfortunately, even if the center conductor to shield voltage differential is limited with an impulse suppressor or the like, the shield currents will likely reach the electronic equipment. These currents may damage sensitive electronic equipment or anything else between the conductor and ground potential.

In most installations the equipment ground and the tower ground are common. This achieves two goals. First, it reduces the overall ground system surge impedance by providing a better distribution of the charge over a larger area. Secondly, since the ground is in parallel with the coax, it will reduce the share of surge current that the coax must handle. However, the physical location of the tower and the electronic equipment often do not lend themselves to proper grounding practices. Such a case would be where the radio room is located on the opposite end of a large building from the tower. In this case, interconnecting the equipment chassis ground with the tower ground would result in a long distance run above the soil or over concrete. This would result in a highly inductive connection that may be worse than having completely separate grounds or even no ground at all.

Figure 17B:
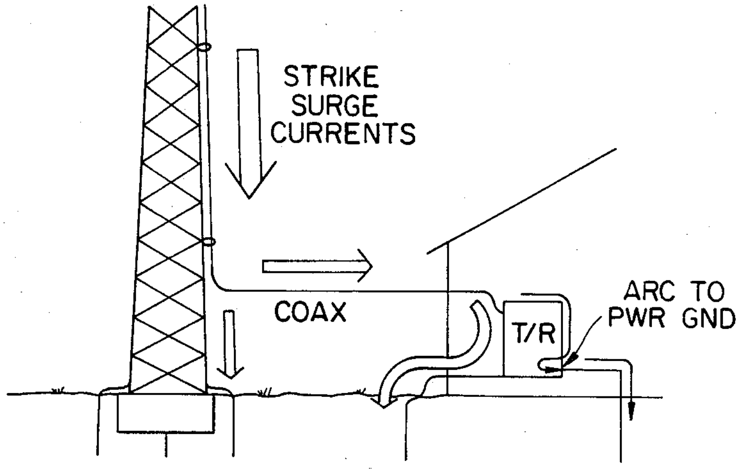
FIG. 17B is a pictorial schematic representation of a tower having an antenna coaxial line grounded at a point spaced therefrom.
Figure 18:
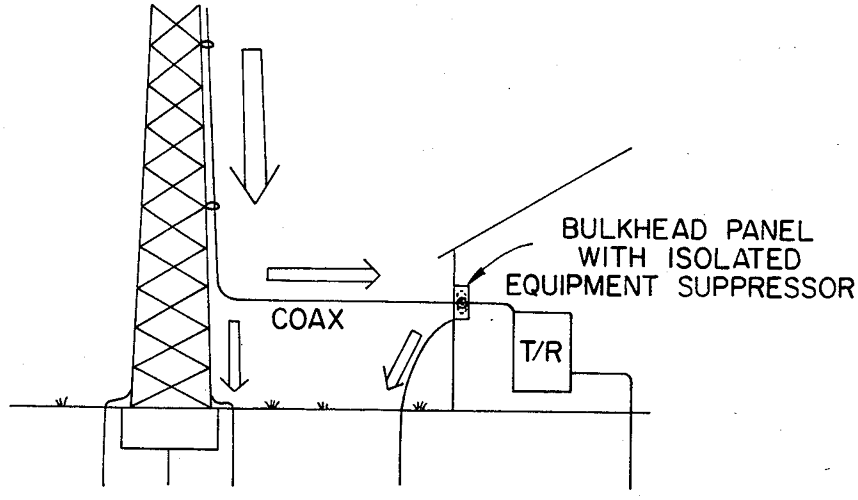
FIG. 18 is a pictorial schematic representation of a tower having an antenna coaxial line using the preferred embodiment of the impulse suppressor and grounded at a separate point.

FIG. 17B depicts the undesirable current flows in a system utilizing separate grounds. The present state of the art for coaxial impulse suppression does not normally recognize the concept of interrupting or breaking the coaxial shield in order to prevent the conduction of this strike energy to the equipment chassis. As illustrated in FIG. 18, the present invention makes use of such shield interruption in order to divert the impulse charge safety to a ground sink before the coax cable leaves the structural support of the tower or before the coax cable enters the building that houses the equipment.

This may be accomplished by using a three electrode gas discharge device such as the TII models 11, 21, or 47 (or Joslyn models 2021-35, 2024-09). The gas discharge tube is connected end to end across the coax, with the center electrode element connected to ground. Other similar gas tubes or similar solid state devices having nearly the same electrical capacitance would be suitable for substitution.

This interruption of the coaxial cable would be accomplished by inserting a D.C. blocking capacitor in both the center conductor as well as the shield. These capacitors would have electrical values that would be transparent to the desired signal, thereby passing the RF energy but blocking the flow of the DC energy. This would require using a small value capacitor in order to minimize the transmission of the strike energy. Because the incoming lightning wavefront has a finite rise time of between 2 microseconds and 8 microseconds, the capacitors must be of small enough capacitance value in order to also act as a differentiator of this wavefront. This differentiation process reduces the maximum voltage that is transmitted to the equipment connector. At the antenna connector, however, the voltage ramp of the lightning wavefront continues until the gas tube voltage threshold is reached and the gas tube crowbars to ground. This determines the duration of the pre-fire differentiated voltage that appears at the equipment connector. The current is determined by the input resistance of the equipment. The pre-fire energy and power now can be calculated. After the gas tube crowbars, the gas tube will act as a constant voltage source of approximately 20 to 30 volts for the remaining duration of the strike, which may be typically as long as 40 to 50 microseconds. The current flow could be equal to the strike itself, but the capacitors prevent most of this longer duration energy from being transmitted to the equipment.

As the gas tube crowbars, the gas tube side of the capacitors will go from the voltage threshold of the gas tube down to the approximate 20 to 30 volts at the ground. The equipment side of each of the capacitors will now abruptly change from the maximum differentiated prestrike voltage to an opposite polarity voltage of prestrike minus the 20 to 30 volts. The duration of this opposite voltage will be determined by the impedance of the equipment and the value of the capacitors.

The capacitors should be electrically located on the equipment side of the impulse suppressor. The position of the three element gas tube with reference to the connectors would determine whether the electrical configuration is a pi network or a T network. Therefore, in order to equalize the current and voltage between the center conductor and ground, between the shield of the coaxial cable and grotund, and between each other, as well as to isolate the antenna coax cable from the equipment, a new preferred embodiment now will be explained.

Figure 19A:
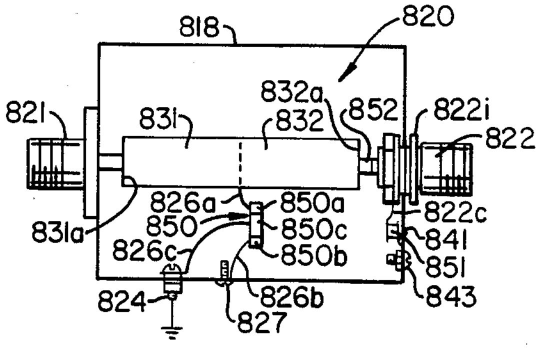
FIGS. 19A and B are top and front sectioned views of a preferred embodiment of the impulse suppressor utilizing two d.c. blocking capacitors.

With specific reference to FIG. 19*a*, a box 818 includes a cavity 820 for containing the elements of the impulse suppressor. A first coaxial connector 821 is designed to be coupled with the antenna side of the coaxial cable. A second coaxial connector 822 is also coupled to the box 818, but is insulated therefrom so as not to be at the same electrical potential. The size of the box 818 (approximately 1.37" by 1.25" by 2"-inside dimensions) is somewhat larger than the earlier embodiments because of the extra shield and ground interconnections make it imperative that the stray capacitances be controlled. A small box would place the conductive elements in close proximity to the center conductor, thus greatly increasing the unwanted stray capacitances and making the design difficult.

Figure 19B:
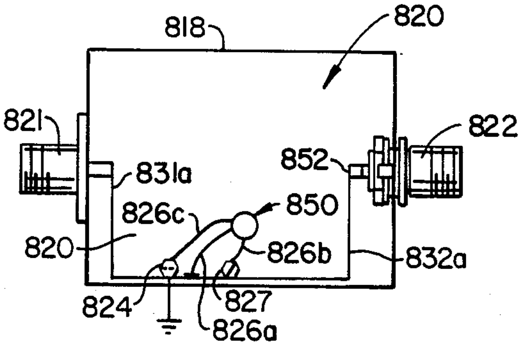
FIG. 19C is a schematic of the embodiment.

The center conductor 831–832 comprises an inductor that is coupled between the center conductor of connector 821 and a chip capacitor 852. The center conductor 831–832 is a copper foil strip having a thickness of approximately 7 mills, a width of approximately 0.45 inches and a length of approximately 1.8 inches. With reference to FIG. 19*b*, the vertical section 831A of the center conductor is approximately 0.44 inches in length, as is the vertical section 832A. The center sections 831 and 832 add together to produce a length of approximately 0.97 inches. The separation between the center conductor 831–832 and the box 818 is approximately 0.1 inches in this embodiment.

The chip capacitor 852 comprises a Johanson Model No. 302H42N151ZP4, or equivalent, having a breakdown voltage of approximately 3,000 volts. This capacitor is connected in series between the center conductor 831–832 and the center conductor of the connector 822.

Another chip capacitor 851 is coupled in series between a solder lug 822*c* attached to the circumference of connector 822, which is the connector that normally is connected to the coaxial cable leading to the ground equipment. The shield of the coaxial cable is not coupled to the box 818 because connector 822 is insulated from the box by the operation of an insulator 822*i* (normally furnished with the connector). Connector 822 is typically a King connector Model KN-79-93. The other side of the chip capacitor 851 is coupled to a solder lug 841, which in turn is coupled through a screw and nut combination 843 to both physically and electrically connect with the box 818.

Chip capacitor 851 provides RF continuity between the shield of the coaxial cable connected to connector 822 and the shield of the coaxial cable coupled to connector 821, while blocking the flow of DC energy therethrough. In a similar manner, blocking capacitor 852 provides RF continuity between the center conductors of connectors 821 and 822, while blocking the flow of DC energy therethrough.

A three element gas discharge tube 850 has a first element 850*a* coupled (either directly or through conductor 826*a*) to the center conductor 831–832. A second section 850*b* of the gas discharge tube 850 is coupled (either directly or through another conductor 826*b*) typically through a screw, bolt and solder lug 827, to the box 818. A center section 850*c* of the gas discharge tube 850 is coupled through a conductor 826*c* to a feedthrough connector 824 that couples through the box 818. This feedthrough connector 824 is electrically and mechanically coupled to a ground sink, such as the electrical grounding system for the site.

Figure 19C:
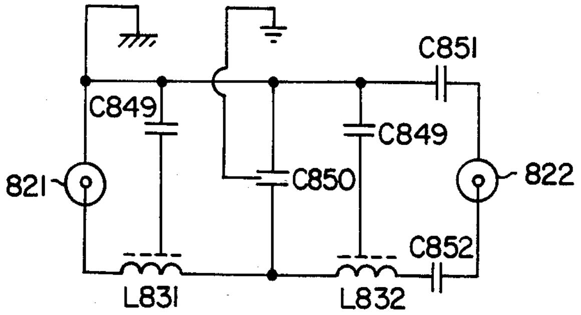

In the preferred embodiment illustrated in FIGS. 19A and B, the discharge tube 850 is actually held in place by the rigid center conductor 831–832 and the inside surface of the box 818. The gas discharge tube 850 is typically spaced from box 818 in order to minimize stray capacitance. A schematic diagram of this embodiment is illustrated in FIG. 19*c*. The electrical element reference numerals in FIG. 19*c* correspond generally to those corresponding physical elements previously described.

As will be recognized from earlier discussions, the capacitor C850 will form a T-network in conjunction with inductors L831 and L832. The values of the capacitor C850 and inductors L831 and L832 can generally be determined through the use of the previously described formulae, if it is assumed that the length to diameter ratios for the inductors are converted to surface area measurements. These formulae are summarized as follows:

$$L=0.0051\ ((2.3\ \log\ (2l/w))-1+0.11(w/l))\times 10^{-6}$$

and $$C=(0.4wl\times 10^{-12})/h$$

where w is the width, l is the length and h is the height above the box, and where the discharge device(s) capacitance(s) is added to the C value above and used in $Z.=\sqrt{L/C}$ for the desired characteristic line impedance.

The operation of this embodiment will now be described. If an impulse occurs on the coaxial line coupled to the antenna, the impulse will arrive at the equipment end of the coax first on the shield and then on the center conductor due to the different velocity propagation factors. The resulting charge will be transferred through the shield of connector 821 to box 818 and to element 850*b* of the gas discharge tube 850. The voltage potential across elements 850*b* to 850*c* will cause the gas discharge tube 850 to conduct, thereby shunting the impulse energy through the conductor 826*c* and the grounding stud 824 into the ground sink. At the same time that gas discharge tube 850 conducts between elements 850*b* and 850*c*, the ionization of the gas therein also will cause a conductive path between elements 850*a* and 850*c*. Once ionization of the chamber gas occurs, the gas will remain in a conducting state for approximately 100 microseconds. This continued conduction will shunt any impulse energy arriving later on the center conductor 831–832 through the first element 850*a* of the gas discharge tube 850 and then through conductor 826*c* to grounding stud 824. The major advantage of this continued conduction is that on longer coax runs the impulse energy actually transmitted to the isolated equipment will be reduced because the conduction in the discharge tube 850 is initiated by the impulse on the shield. Therefore, the conduction path between the center conductor and ground is actually initiated before the impulse energy on the center conductor rises to a level capable of turning on the gas discharge tube by itself.

This conducting action of the gas discharge tube 850 not only shunts the electrical impulse from the center conductor 831–832 to ground, and the impulse energy from the shield of the coax through the box 818 to ground, but the common chamber of the gas discharge tube 850 also will limit the maximum voltage occuring between the center conductor and shield of the antenna coaxial cable. Since the impulse energy is shunted to ground through the action of gas discharge tube 850, only a limited differentiated impulse will be transmitted through the blocking capacitors 851 and 852, through the connector 822 and into the equipment coupled thereto.

Figure 20A:
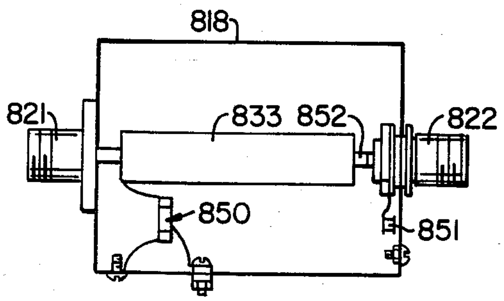
FIGS. 20A and B illustrate a top and schematic representations of another preferred embodiment of the dual blocking capacitor impulse suppressor.
Figure 20B:
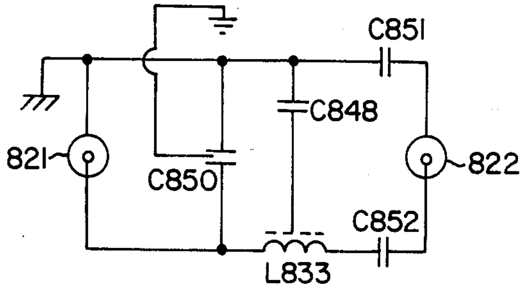

With reference to FIGS. 20*a* and 20*b*, an alternate embodiment of the invention is illustrated as having a gas discharge tube 850 coupled to the center conductor 833 adjacent to the connector 821. This non-symmetrical construction combines the previously described inductors 831 and 832 to form a new inductor 833. While the spacing between the center conductor 833 and box 818 will change in this embodiment to approximately 0.05 inches, as required in order to maintain the transmission line impedance, the general construction of the device is similar to that shown in FIGS. 19*a* and *b*.

A schematic diagram of this "pi" model of the impulse suppressor is shown in FIG. 20*b*, with the reference numerals of the electrical elements corresponding to the same elements having like reference numerals in FIG. 20*a*. The calculation of the value of these electrical elements can be derived from the formulae previously discussed by changing the length-to-diameter ratio to a surface area of the two adjacent elements 818 and 833. The effective size and separation of these plates 818 and 833 determine not only the capacitance, but also the relative inductance.

While three element gas tubes have been defined with respect to FIGS. 19 and 20, it will be apparent that a two element gas tube, or similar functionally equivalent semiconductor device, can also be used on short coaxial runs and in applications where it is not necessary to isolate the box 818 from the ground sink. The formulae provided will also allow the calculation of the dimensions and electrical values for the elements which have been previously discussed. The use of the two DC blocking capacitors in the center conductor and the sheild will, in a similar manner, limit the transmission of impulse energy along both the center conductor and the shield of the coaxial transmission lines.

Figure 21A:
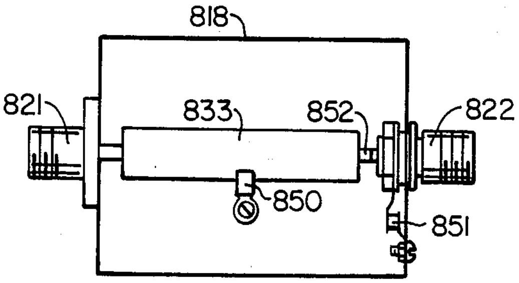
FIGS. 21A and B illustrate a "T" network version of the impulse dual blocking capacitor suppressor.
Figure 21B:
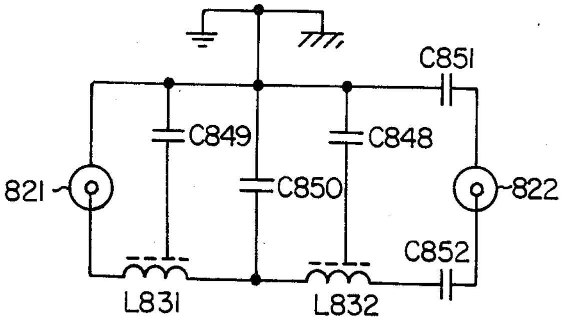

The major difference in the alternate embodiment shown in FIGS. 21A and 21B is that the capacitance between the center conductor and the shield of the cable will be much greater by using a two element gas tube as compared with the typical capacitance exhibited by the three element gas tube shown in the embodiment of FIG. 19. This characteristic of the two element gas discharge tube will have the effect of causing the designer to raise the lower portion of the center conductor 833 away from the adjacent surface of the box 818. Typically, the 0.1 inch dimension will increase to approximately 0.18 inches. The dimensions of the box and the center conductor are in most other respects approximately equal to the dimensions of those elements used in the embodiments employing a three element gas tube.

Figure 22A:
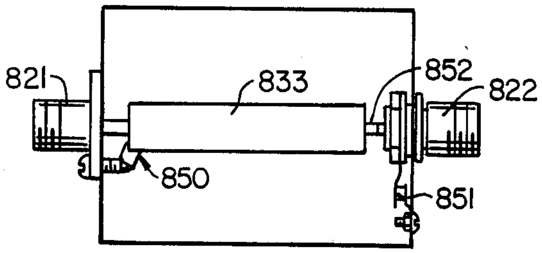
FIGS. 22A and B illustrate a "pi" netwojrk version of the dual impulse capacitor impulse suppressor.
Figure 22B:
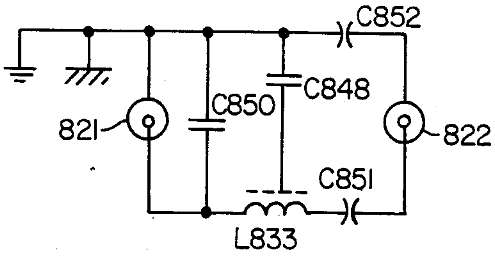

FIGS. 22A and 22B illustrate a "pi" network version of the "T" network impulse suppressor explained with respect to FIGS. 21A and 21B.

ADDITIONAL IMPROVEMENTS TO ORIGINAL EMBODIMENTS

A multi-stage embodiment will now be described with reference to FIGS. 23A and B. Many VHF-UHF applications require the use extremely sensitive high technology preamplifiers that utilize devices such as GaAs semiconductor devices that are easily destroyed by overvoltage impulses. In receive only or low power transmit applications, a second discharge device is helpful in protecting these sensitive semiconductor amplifiers.

As has been previously described, the use of a capacitor in series with the center conductor of the impulse suppressor will serve to differentiate the waveform of the incoming impulse voltage. Since the impulse voltage rises with a finite slope during the first few nanoseconds, the differential of this voltage will produce a generally constant output voltage. This output voltage can exceed 200 volts across a 50 ohm resistance. However, this series capacitor will greatly reduce the current available for allowing the second discharge device to conduct. Therefore, with respect to this second discharge device it is advisable to use a device such as a neon gas tube that has a low firing voltage (approximately 90 volts). The threshold mode of this neon discharge device will provide a low "on resistance" to insure a small time constant to discharge the capacitor, while also differentiating the voltage traveling along the center conductor of the coaxial line. The second discharhge device also serves to dampen the reversal voltage of the first capacitor that occurs when the first discharge device fires. Although an inductor could be substituted for this second gas tube, the inductance could cause a ringing voltage at the equipment in the lower frequency response ranges.

As with the previous embodiments, the use of a second series capacitor in the center conductor of the coaxial line is suggested in order to insure the proper operation of the second discharge device. This second series capacitor will also serve to differentiate the waveform that has been clamped by the second discharge device. The output from this second capacitor will appear as several small impulses, each occurring at the squarewave transitions. This waveform thus will have a much lower energy content than the original impulse.

An inductor coupled between the center conductor and ground will help to minimize the energy throughput to the equipment by insuring that a minimum resistance is present to form the shortest possible time constant for the differentiation process, as well as insuring that any dielectric leakage of the series capacitor will not, at least on a long term basis, be transferred to the bias sensitive low noise preamplifier. The inductor, together with the two capacitors, will act to limit the low frequency response of the entire impulse suppressor device.

Figure 23A:
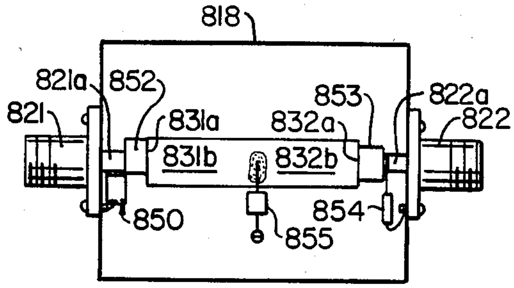
FIGS. 23A and B illustrate top and schematic representations of a multistage embodiment of the impulse suppressor.

With specific reference to FIG. 23A, a chip capacitor 852, typically a Johanson Model 302H42N151ZP4 having a breakdown voltage of approximately 3000 volts, is connected in series between the center conductor 821*a* of the input connector 821 and the vertical section 831A of the center conductor 831-832. A first gas discharge device 850 similar to those discussed with respect to previous embodiments is connected between the center conductor 821*a* and the conductive box 818. A second gas discharge device 855, typically a neon gas discharge tube such as Model SR-90L manufactured by Reliance Electric Co., is connected between the box 818 and the center section of the center conductor 831A and B. A second chip capacitor 853, identical in value to 852, is connected between the vertical section 832A and the center conductor 822*a* of the connector 822. An inductor 854, having a typical value of 0.15 microHenry (which provides an average frequency range of 250 MHz to 1 GHz) is connected between the box 818 and the center conductor 822*a*.

The impulse suppressor illustrated in FIG. 23A and B is operated by orienting the connector 821 so as to receive the impulse to be suppressed. The slope of a typical lightning impulse may be as high as 10 KV microsecond. The first gas discharge tube 850, having a firing voltage of approximately 600 volts, will not start to conduct until approximately 1.1 KV due to the fast rise time of the impulse and the conduction delay of the gas. This sloping voltage will be differentiated by the first series capacitor 852 when the second discharge device 855 conducts at a threshold of 90 volts. This will clamp the voltage along the center conductor 831*b*-832*b*. The second series capacitor 853, together with the low resistance of inductor 854, again will differentiate the output waveform (approximately square wave) of the second discharge device 855, thus resulting in only small impulse voltages to be conducted through the center conductor 822*a* of the output connector 822. The energy in these smaller impulses is typically not sufficient to destroy the semiconductor or other sensitive electronic components coupled thereto.

High preformance receiving and/or transmitting systems often require the location of low noise preamplifiers and/or power amplifiers as close to physically possible to the antenna in order to minimize transmission line loses. In order to minimize the complexity of these installations, the coaxial line connecting the station equipment with the antenna is often used not only to conduct the RF signal, but also for providing power and switching of the remote equipment.

The use of an impulse suppressor of the type previously discussed is required adjacent to the ground equipment in order to attenuate the lighting impulse appearing at the equipment end of the coax cable. However, a second impulse suppressor is also required adjacent the electronic equipment located adjacent to the antenna.

Since this sensitive electronic equipment is located in close proximity (usually in the same top tower section) as the grounded antenna, the lightning impulse will typically not generate a large voltage differential across the preamplifier or power amplifier as was previously discussed, the largest voltage is induced in the coax by the impulse current flowing through the resistive joints connecting adjacent sections of the tower. This impulse voltage appearing along the coax will fire the discharge device in the impulse suppressor located adjacent the equipment below. The impulse suppressor will safely conduct the impulse to the grounding system in order to avoid injury to the equipment.

However, because of the finite turn on speed of the discharge device, the finite rise time of the lightning impulse and the normal generation of EMI/RFI energy from the arc mode of the gas discharge device, additional rf energy will be generated from the energy dissipated in the gas discharge device. This impulse energy, which is mostly on the antenna coax port, will be directed upwardly along the coaxial line toward the equipment located adjacent the antenna. While little is known about the actual frequency distribution of this reverse impulse generated by the gas discharge device, it may be thought of as a low frequency pink noise generator exciting the coaxial transmission line.

As this reverse impulse traverses up the coax it does not see a typical 50 ohm termination impedance, but instead sees a higher impedance that is characteristic of the active devices located in the equipment adjacent to the antenna. Furthermore, the low frequency components of the pink noise energy are enhanced by the resonant effect of the length of coaxial line that connect the equipment at the bottom of the tower with the equipment nearer the antenna. The combination of all of these factors can induce extremely high voltages between the center conductor and the shield of the coax at the equipment located adjacent the antenna. These high voltages obviously can cause the breakdown of the coupling capacitors and active components in the remote equipment.

Figure 23B:
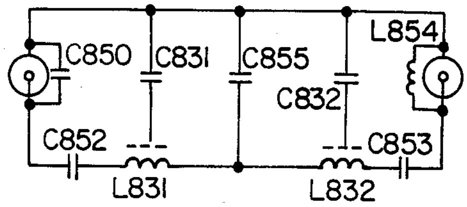

A new embodiment of the impulse suppressor capable of protecting the remotely powered preamplifier/power amplifiers located near the antenna will now be described with reference to FIG. 24. This new embodiment includes the same basic components and interconnections as were described with regard to FIG. 23. In addition, a small choke 856 is coupled to the center conductor 821*a* of the connector 821. The inductance of this choke is small, typically less than 1 MicroHenry, because the frequencies of concern are typically above 250 MHz. Since the inductor 856 has a relatively small inductance, any flow of impulse energy therethrough will produce only a small voltage drop (L di/dt). Potentially damaging currents thus can be induced well before the first discharge device 850 begins to conduct. Therefore, additional voltage isolation and clamping are required. Furthermore, since RFI could be a problem, it is advisable to use a feedthrough capacitor or pi network in order to remove the DC voltage from the RF shielded enclosure.

An MOV device 858 (typically a Siemens Model S20K11) is connected between the inductor 856 and a ground lug 819 coupled to the box 818. A low resistance resistor 859 (typically a 1 ohm, 1 watt resistor) is coupled between the inductor 856 and the feedthrough 857. A Transorb device 860 (typical manufactured by General Semiconductor Industries, Model No. ICTE-15) is coupled between the resistor 859 and the ground potential of the box 818. The MOV device 858 will handle the momemtary high current surges through the inductor 856 until the current creates a voltage (L di/dt) sufficient to cause the first discharge device 850 to conduct. The MOV device 858 is typically capable of handling relatively high currents but only for short periods of time. The MOV device 858 is located adjacent to the inductor 856 because the clamping ratio of the MOV device is not as great as that of the Transorb, and also because the peak current handling of the MOV device 858 is almost 40 times as great as that of the Transorb device 860.

Resistor 859 functions as a decoupling resistance between stages. This allows additional I×R drop when the higher clamping ratio Transorb device 860 goes into conduction. It should be noted that the Transorb device 860 is available in two different varieties. If an AC voltage is injected along the center conductor of the coaxial cable, back-to-back zenor type Transorb is suggested. If a DC voltage is injected along the center conductor of the coaxial cable a singe polarity zener type Transorb device 860 should be used.

For equipment requiring relatively high currents (such as a power amplifier) the value of the series resistor 859 should be reduced in order to minimize the series voltage drop. If the power supply voltage is in the range of 20–30 volts, then the I×R voltage drop across the series resistor 859 must be less than the minimum voltage required to maintain conduction of the first discharge device 850 in order to allow the arc within the discharge device 850 to extinguish normally. It may be advisable under these circumstances to replace the first gas tube with a three element model such as TII Model 47B or 47BT (or Joslyn Model 2021–35 or 2024–09 used end to end). This substitution will nearly double the sustaining arc voltage requirement of the gas discharge tube 850, thus elevating it to the 40–60 volt region. Thus, any series voltage drop induced by the series resistor 859 will not in itself induce the continuous arcing of the discharge device 850. The throughput energy at the RF port of the equipment will not be degraded due to this substitution because the second discharge device 855 and second capacitor 853 will determine the maximum throughput energy to the RF port of the equipment.

Figure 24A:
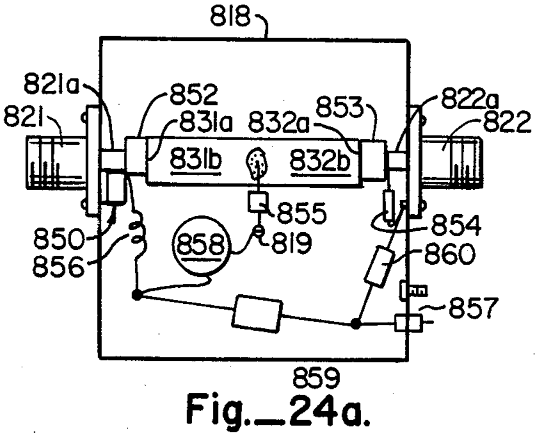
FIGS. 24A and B illustrate top and schematic representations of a, multistage embodiment of an impulse suppressor capable of inserting or removing a control voltage onto the center conductor of the coaxial cable.
Figure 24B:
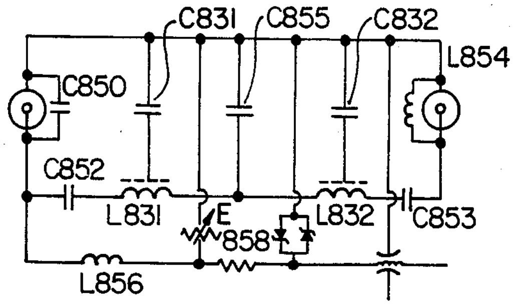

In this manner, the impulse suppressor illustrated generally in FIG. 24A may be utilized to remove a DC (or other relatively low voltage) power or control signal from the center conductor of the coaxial line. For proper operation, the coaxial connector 821 should be connected to the coaxial line running up the tower, while the preamplifier and antenna coaxial line should be connected to connector 822. The DC or control voltage would then be available at the feedthrough 857. Of course, the same impulse suppressor illustrated in FIG. 24A should be utilized at the bottom of the tower in order to place the DC or control voltage on the center conductor of the coaxial line. Under these circumstances the DC or control voltage is coupled to the feedthrough 857, while the connector 821 is coupled to the coax running up the tower. Connector 822 is coupled to the receiving and/or transmitting equipment in the station.

The embodiments of the present electromagnetic impulse suppressors have been described as examples of the invention as claimed. However, the present invention should not be limited in its application to the details and constructions illustrated in the accompanying drawings and in the specification, since this invention may be practiced or constructed in a variety of other different embodiments, such as those defined by the mathematical relationships explained herein. Also, it must be understood that the terminology and descriptions employed herein are used solely for the purpose of describing the general concepts of the invention and the preferred embodiments best exemplifying those concepts, and therefore should not be construed as limitations on the invention or its operability.

I claim:

1. An electrical surge suppressor for shunting electromagnetic impulse energy traveling along a radio frequency signal transmission line of the type having primary and secondary conductors and a known characteristic impedance therebetween, the suppressor comprising in combination:

first and second electrical connector means each having primary and secondary conductors for being operatively interposed along the primary and secondary conductors of the radio frequency signal transmission line;

discharge means including first and second discharge devices each for defining a known breakdown voltage and a known capacitance between first and second sections thereof;

first means for electrically coupling said first section of said first discharge device between said primary conductors of said first and second electrical connector means;

second means for electrically coupling said first section of said second discharge device between said secondary conductors of said first and second electrical connector means;

a first capacitor interposed along said first means and a second capacitor interposed along said second means for blocking the flow of DC energy through the primary and secondary conductors; and third means for electrically coupling said second section of each of said discharge devices to a ground potential, with said first means and said second means and said third means having known inductances which interact with the capacitance of said discharge means and any stray capacitance of the combination thereof to produce a charcteristic impedance which is generally equal to the characteristic impedance of the radio frequency signal cable, whereby the suppressor will shunt electrical impulse energy to ground potential while normally representing a low standing wave ratio for radio frequency energy transmitted along the transmission line.

2. The surge suppressor as described in claim 1 wherein said second means further includes groundplane means juxtaposed with said first and second means for defining a cavity which at least partially contains said discharge means and said first means therein.

3. The surge suppressor as described in claim 2 wherein:

said first means comprises first inductor means operatively coupled between said primary conductors of said first and second electrical connectors; and wherein said groundplane means is generally parallel to said first and said second inductor means.

4. The surge suppressor as described in claim 1, wherein said first and second discharge devices comprise a three element discharge device of the type where both of said first sections will be operatively coupled to said second section upon the conduction of either said first or second discharge device.

5. The surge suppressor as described in claim 1, wherein said first and second discharge means comprise discharge tubes filled with a gas other than air.

6. An electrical surge suppressor for shunting electromagnetic impulse energy from the center conductor to the shield of a coaxial transmission line having a known characteristic impedance, the electrical surge suppressor comprising in combination:

a first conductor interposed between adjacent sections of the center conductor;

a first capacitor coupled in series with said first conductor for blocking the flow of D.C. energy therethrough;

a circumferential conductor interposed between adjacent sections of the shield so as to define a cavity therein;

a second capacitor coupled in series with said circumferential conductor for blocking the flow of D.C. energy therethrough;

discharge means for defining a known breakdown voltage and a known capacitance between first and second sections thereof, with said first section coupled to said first conductor and with said second section coupled to said circumferential conductor such that said discharge means and said first and second capacitors are at least partially contained within said cavity defined by said circumferential conductor and such that said discharge means is operatively coupled on the same side of said first and second capacitors; and wherein the inductance of said first conductor and said circumferential conductor interact with said capacitance of said discharge means and said first and second capacitors and stray capacitance of the combination thereof so as to produce a desired characteristic impedance generally equal to the characteristic impedance of the coaxial transmission line, whereby the surge suppressor will shunt impulse energy exceeding the breakdown voltage of said discharge means from the center conductor to the shield while normally representing a low VSWR for radio frequency energy transmitted along the coaxial transmission line.

7. The surge suppressor as described in claim 6 wherein said discharge means comprises a three element discharge device of the type wherein both said first and second sections thereof will be electrically coupled to a third section thereof upon the conduction of either section, and wherein said third section is operatively coupled to ground.

8. The electrical surge suppressor as defined in claim 7 wherein said first conductor comprises at least portions of the center conductor sections of oppossing coaxial connectors.

9. The surge suppressor as described in claim 5 wherein said discharge means comprises a discharge tube having a gas other than air therein.

10. The surge suppressor as described in claim 6 wherein said circumferential conductor includes groundplane means juxtaposed with said first conductor.

11. A combination matching network and electrical surge suppressor for matching the characteristic impedance along a coaxial cable and for shunting electromagnetic impulse energy from the center conductor to the shield thereof, the device comprising in combination:

first and second connector means each having a primary conductor coupled to the center conductor of the coaxial cable;

a first capacitor operatively interposed between said primary conductors of said first and second connector means for blocking the flow of D.C. energy therethrough;

a circumferential conductor operatively interposed between adjacent sections of the shield of the coaxial cable so as to define therein a cavity for a least partially containing said primary conductors;

a second capacitor operatively interposed along said circumferential conductor for blocking the flow of DC energy therethrough;

discharge means for defining a known breakdown voltage and a known capacitance between first and second sections thereof, with said first section coupled to said primary conductor and with said second section being coupled to said circumferential conductor such that said first and second capacitor and said discharge means are contained at least partially within said cavity and such that said discharge means is operatively coupled on the same side of said first and second capacitors; and wherein the inductances of said primary conductors and said circumferential conductor interact with the capacitance of said discharge means and said first and second capacitors and stray capacitances of the combination thereof so as to produce a desired characteristic impedance having a known relationship to the characteristic impedance of the coaxial cable, whereby the device will normally represent a low VSWR for radio frequency energy propagating along the coaxial cable.

12. The device as described in claim 11 wherein said discharge means comprises a three element discharge device of the type wherein said first and second sections thereof will be operatively coupled to a third section thereof upon the conduction of either said first or second section, and wherein said third section is coupled to ground.

13. The device as described in claim 12 wherein said discharge means comprises a gas discharge tube having therein a gas other than air.

14. The device as described in claim 12 wherein said desired characteristic impedance is different than the characteristic impedance along the coaxial cable, whereby said device operates as a matching network for matching an impedance along one part of the coaxial cable with a different impedance along another part of the coaxial cable.

15. A method for matching the characteristic impedance of a radio frequency transmission line of the type having first and second conductors while shunting electromagnetic impulse energy traveling therethrough, said method comprising the steps of:

(a) electrically interposing primary and secondary conductors along corresponding first and second conductors of the transmission line;

(b) coupling discharge means, for defining a known breakdown voltage and a known capacitance, between said primary and secondary conductors;

(c) interposing first and second capacitors respectively in series with said first and second conductors on the same side of said discharge means, for blocking the flow of DC energy through said conductors;

(d) matching the characteristic impedance of the transmission line with the characteristic impedance represented by the combination of said primary conductor, said secondary conductor, said first and second capacitors and said discharge means and any stray capacitance associated with the combination thereof, while enabling said discharge means to shunt electromagnetic impulse energy between the first and second conductors of the transmission line.

16. An electrical surge suppressor for shunting electromagnetic impulse energy from a coaxial transmission line having a known characteristic impedance, the electrical surge suppressor comprising in combination:

a first conductor coupled between adjacent sections of the center conductor;

a first capacitor coupled in series along said first conductor for differentiating the impulse traveling therethrough;

a second capacitor coupled in series along said first conductor;

a circumferential conductor interposed between adjacent sections of the shield so as to define a cavity therein;

first discharge means for defining a known breakdown voltage and a known capacitance between first and second sections thereof, with said first section coupled to said first conductor on the opposite side of said first capacitor from said second capacitor, and with said second section coupled to said circumferential conductor such that said first discharge means and said first capacitor are at least partially contained within said cavity defined by said circumferential conductor;

second discharge means for defining a known breakdown voltage and a known capacitance between said first and second sections thereof, with said first section coupled to said first conductor between said first and second capacitors, and with said second section coupled to said circumferential conductor such that said second discharge means and said second capacitor are at least partially contained within said cavity; and wherein the inductance of said first conductor and said circumferential conductor interact with said capacitance of said first and second discharge means and said first and second capacitors and stray capacitance of the combination thereof so as to produce a desired characteristic impedance generally equal to the characteristic impedance of the coaxial transmission line, whereby the surge suppressor will shunt impulse energy exceeding the breakdown voltage of said discharge means from the center conductor to the shield while normally representing a low VSWR for radio frequency energy transmsitted along the coaxial transmission line.

17. The surge suppressor as described in claim 16 wherein said discharge means comprises a non-air gap type device.

18. The surge suppressor as described in claim 16 wherein said discharge means comprises a discharge tube having a gas other than air therein.

19. The surge suppressor as described in claim 16 wherein said discharge means comprises a semiconductor device.

20. The surge suppressor as described in claim 16 further including means for coupling a DC control signal to said primary conductor.

21. A method for matching the characteristic impedance of a radio frequency transmission line of the type having first and second conductors while shunting electromagnetic impulse energy traveling therethrough, said method comprising the steps of:

(a) electrically interposing primary and secondary conductors along corresponding first and second conductors of the transmission line;

(d) coupling first discharge means, for defining a known breakdown voltage and a known capacitance, between said primary and secondary conductors on the side of said first capacitor opposite said second capacitor;

(b) interposing a first capacitor in series with said first conductor;

(c) interposing a second capacitor in series with said first conductor;

(e) coupling second discharge means, for defining a known breakdown voltage and a known capacitance, between said second conductor and a section of said primary conductor between said first and second capacitors;

(f) matching the characteristic impedance of the transmission line with the characteristic impedance represented by the combination of said primary conductor, said secondary conductor, said first and second capacitors and said first and second discharge means and any stray capacitance associated with the combination thereof, while enabling said first and second discharge means to shunt electromagnetic impulse energy between the first and second conductors of the transmission line.

22. An electrical surge suppressor for shunting electromagnetic impulse energy from the center conductor to the shield of a coaxial transmission line having a known characteristic impedance, the electrical surge suppressor comprising in combination:

a first conductor interposed between adjacent sections of the center conductor;

a capacitor coupled in series with said first conductor for blocking the flow of D.C. energy therethrough;

means for coupling a control signal to said center conductor;

a circumferential conductor interposed between adjacent sections of the shield so as to define a cavity therein;

discharge means for defining a known breakdown voltage and a known capacitance between first and second sections thereof, with said first section coupled to said first conductor and with said second section coupled to said circumferential conductor such that said discharge means and said capacitor are at least partially contained within said cavity defined by said circumferential conductor; and wherein the inductance of said first conductor and said circumferential conductor interact with said capacitance of said discharge means and said capacitor and stray capacitance of the combination thereof so as to produce a desired characteristic impedance generally equal to the characteristic impedance of the coaxial transmission line, whereby the surge suppressor will shunt impulse energy exceeding the breakdown voltage of said discharge means from the center conductor to the shield while normally representing a low VSWR for radio frequency energy transmitted along the coaxial transmission line.

23. The surge suppressor as described in claim 22 wherein said coupling means comprises:

secondary inductance means coupled to said first conductor for operably receiving the control signal;

first means coupled in series with said secondary inductance and ground for dissipating part of the impulse energy while producing a voltage with the polarity necessary for said discharge means to reach said breakdown voltage; and decoupling means, coupled to said secondary inductance and said first means, for removing said control signal therefrom.

* * * * *